United States Patent
Yu et al.

(10) Patent No.: US 9,860,349 B2
(45) Date of Patent: Jan. 2, 2018

(54) METHOD FOR TRANSMITTING AND RECEIVING FRAME, AND WIRELESS DEVICE IMPLEMENTING THE SAME METHOD

(71) Applicant: NEWRACOM, INC., Irvine, CA (US)

(72) Inventors: Heejung Yu, Daegu (KR); Daewon Lee, Irvine, CA (US); Young Hoon Kwon, Irvine, CA (US); Sungho Moon, Irvine, CA (US); Yujin Noh, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 15/081,578

(22) Filed: Mar. 25, 2016

(65) Prior Publication Data

US 2016/0286012 A1    Sep. 29, 2016

Related U.S. Application Data

(60) Provisional application No. 62/138,294, filed on Mar. 25, 2015, provisional application No. 62/145,428, filed on Apr. 9, 2015.

(51) Int. Cl.
*H04L 29/08*    (2006.01)
*H04L 1/08*    (2006.01)
(Continued)

(52) U.S. Cl.
CPC ............. *H04L 69/321* (2013.01); *H04L 1/08* (2013.01); *H04L 27/2338* (2013.01);
(Continued)

(58) Field of Classification Search
CPC ....... H04L 1/08; H04L 5/0007; H04L 5/0044; H04L 5/0046; H04L 5/0048;
(Continued)

(56) References Cited

U.S. PATENT DOCUMENTS

2004/0109508 A1*  6/2004  Jeon ................... H04L 27/2657
                                                                                          375/260
2005/0281292 A1* 12/2005  Troulis ............... H04L 27/2657
                                                                                          370/516

(Continued)

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Young T Tse

(57) ABSTRACT

A method for transmitting a frame is provided by a device in a wireless communication network. The device compensates a carrier frequency using a value of carrier frequency offset (CFO), and transmits a frame with the compensated carrier frequency to a receiver. The value of the CFO is indicated in TXVECTOR. A method for transmitting a frame is provided by a device in a wireless communication network. The device allocates data tones for a last symbol based on a payload size, generates the last symbol having repeated waveforms and transmits a frame including at least one period waveform of the repeated waveforms in the last symbol.

12 Claims, 28 Drawing Sheets

(51) Int. Cl.
  *H04L 27/26* (2006.01)
  *H04L 27/233* (2006.01)
  *H04L 5/00* (2006.01)
  *H04L 27/00* (2006.01)

(52) U.S. Cl.
  CPC ...... *H04L 27/2634* (2013.01); *H04L 27/2646* (2013.01); *H04L 69/323* (2013.01); *H04L 5/0044* (2013.01); *H04L 5/0046* (2013.01); *H04L 5/0048* (2013.01); *H04L 2027/0026* (2013.01)

(58) Field of Classification Search
  CPC .............. H04L 27/2338; H04L 27/2628; H04L 27/263; H04L 27/2634; H04L 27/2646; H04L 27/2656; H04L 27/2657; H04L 27/2659; H04L 27/266; H04L 69/321; H04L 69/323; H04L 2027/0018; H04L 2027/0026
  USPC ......... 375/259–262, 265, 344, 345; 370/208, 370/210, 335, 337, 342, 344, 349, 441, 370/442, 445
  See application file for complete search history.

(56) References Cited

U.S. PATENT DOCUMENTS

| | | | |
|---|---|---|---|
| 2006/0114928 A1* | 6/2006 | Utsunomiya | H04W 74/0808 370/448 |
| 2006/0156162 A1* | 7/2006 | Choi | H04L 1/1877 714/748 |
| 2015/0172086 A1* | 6/2015 | Khoshgard | H04L 27/2646 375/260 |

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

* cited by examiner

FIG. 13

| L-STF | L-LTF | L-SIG | HE-SIG-A | HE-STF | HE-LTF | DATA |

METHOD FOR TRANSMITTING AND RECEIVING FRAME, AND WIRELESS DEVICE IMPLEMENTING THE SAME METHOD

CROSS-REFERENCE TO RELATED APPLICATION

This application claims priority to and the benefit of U.S. Provisional Application Nos. 62/138,294 and 62/145,428, filed on Mar. 25, 2015 and Apr. 9, 2015 in the United States Patent and Trademark Office, the entire contents of which are incorporated herein by reference.

BACKGROUND (a) Field

The described technology relates generally to a method for transmitting and receiving frame. More particularly, the described technology relates generally to a method for transmitting and receiving frame in a wireless local area network (WLAN)

(b) Description of the Related Art

A WLAN is being standardized by the IEEE (Institute of Electrical and Electronics Engineers) Part 11 under the name of "Wireless LAN Medium Access Control (MAC) and Physical Layer (PHY) Specifications."

After an original standard was published in 1999, new version standards are continuously published by amendments. The IEEE standard 802.11a (IEEE Std 802.11a-1999) supporting 2.4 GHz band was published in 1999, the IEEE standard 802.11b (IEEE Std 802.11b-1999) supporting 5 GHz band was published in 1999, and the IEEE standard 802.11g (IEEE Std 802.11g-2003) supporting 5 GHz band was published in 2003. These standards are called legacy. Subsequently, the IEEE standard 802.11n (IEEE Std 802.11n-2009) for enhancements for higher throughput (HT) was published in 2009, and the IEEE standard 802.11ac (IEEE 802.11ac-2013) for enhancements for very high throughput (VHT) was published in 2013. Recently, a high efficiency (HE) WLAN for enhancing the system throughput in high density scenarios is being developed by the IEEE 802.11ax task group.

SUMMARY

The present disclosure provides a method for transmitting and receiving frame. The present disclosure provides a wireless device implementing the method for transmitting and receiving frame.

According to an embodiment, a method for facilitating wireless communications is provided by a wireless device. The method includes receiving a first PPDU (PHY Protocol Data Unit) in a physical layer, delivering a first PSDU (Physical Service Data Unit) and an information indicative of a carrier frequency offset (CFO) derived from the first PPDU to a MAC (Media Access Control) layer, generating a second PSDU in the MAC layer, delivering the second PSDU and an information indicative of the CFO to the physical layer, generating a second PPDU using the information indicative of the CFO, and transmitting the second PPDU over a wireless channel.

A destination of the second PPDU may be identical to a source of the first PPDU.

The information indicative of the CFO may be delivered from the physical layer to the MAC layer via RXVECTOR.

The information indicative of the CFO may be delivered from the MAC layer to the physical layer via TXVECTOR.

The generating of the second PPDU may include pre-compensating a carrier frequency of the second PPDU using the information indicative of the CFO.

The generating of the second PPDU may further include pre-compensating a sampling frequency of the second PPDU using the value of a sampling frequency offset (SFO). The value of the SFO may be calculated based on the CFO.

The pre-compensating of the sampling frequency may be performed before an inverse Fourier transform operation. The pre-compensating of the carrier frequency may be performed after the inverse Fourier transform operation.

The generating of the second PPDU may further include correcting the output of the compensating of the sampling frequency by subtracting or adding one sample in the output of the inverse Fourier transform.

According to another embodiment, a wireless device for facilitating wireless communications includes a first pre-compensator to compensate a sampling frequency with a sampling frequency offset (SFO), an inverse Fourier transformer to perform an inverse Fourier transform to the output of the first pre-compensator, and a second pre-compensator to compensate a carrier frequency with a carrier frequency offset (CFO) to the output of the inverse Fourier transformer. A value of CFO may be delivered from a Media Access Control layer via TXVECTOR.

The first pre-compensator may calculate a value of the SFO from the value of the CFO.

The value of the CFO may be estimated by using a receive frame in a physical layer and delivered to the Media Access Control layer via a RXVECTOR. The value of the CFO may be stored with a source of the receive frame in the Media Access Control layer. The value of the CFO may be included in the TXVECTOR when a destination of a transmit frame is identical to the source of the receive frame.

The device may further include a guard interval inserter to correct the output of the first pre-compensator by subtracting or adding one sample in the output of the inverse Fourier transformer.

According to yet another embodiment, a method for facilitating wireless communications is provided by a wireless device. The method includes allocating data tones for a last symbol based on a payload size, generating the last symbol having repeated waveforms, and transmitting a frame including at least one period waveform of the repeated waveforms in the last symbol.

Indices of the data tones may be determined according to a number of used data tones in the last symbol before padding.

The data tones may be allocated to 8k indexed data subcarriers, and the one period waveform is one-eighth of the repeated waveforms. The k denotes negative and positive sequence integers.

The data tones may be allocated to 4k indexed data subcarriers, and the one period waveform is a quarter of the repeated waveforms. The k denotes negative and positive sequence integers.

The data tones may be allocated to 2k indexed data subcarriers, and the one period waveform is one half of the repeated waveforms. The k denotes negative and positive sequence integers.

The frame may include an indicator to indicate repetition information of the last symbol.

The one period waveform included in the last symbol may be repeated several times to generate the entire repeated waveforms at a receiver.

Used data tones in the last symbol may come first by applying Fourier transform to the entire repeated waveforms. The used data tones may be 8k indexed data subcarriers, 4k indexed data subcarriers, 2k indexed data subcarriers, or k indexed data subcarriers. The k denotes negative and positive sequence integers.

BRIEF DESCRIPTION OF THE DRAWINGS

FIG. 13 exemplifies a frame format of a wireless communication network according to embodiments of the present disclosure.

DETAILED DESCRIPTION OF THE EMBODIMENTS

Figure 1:
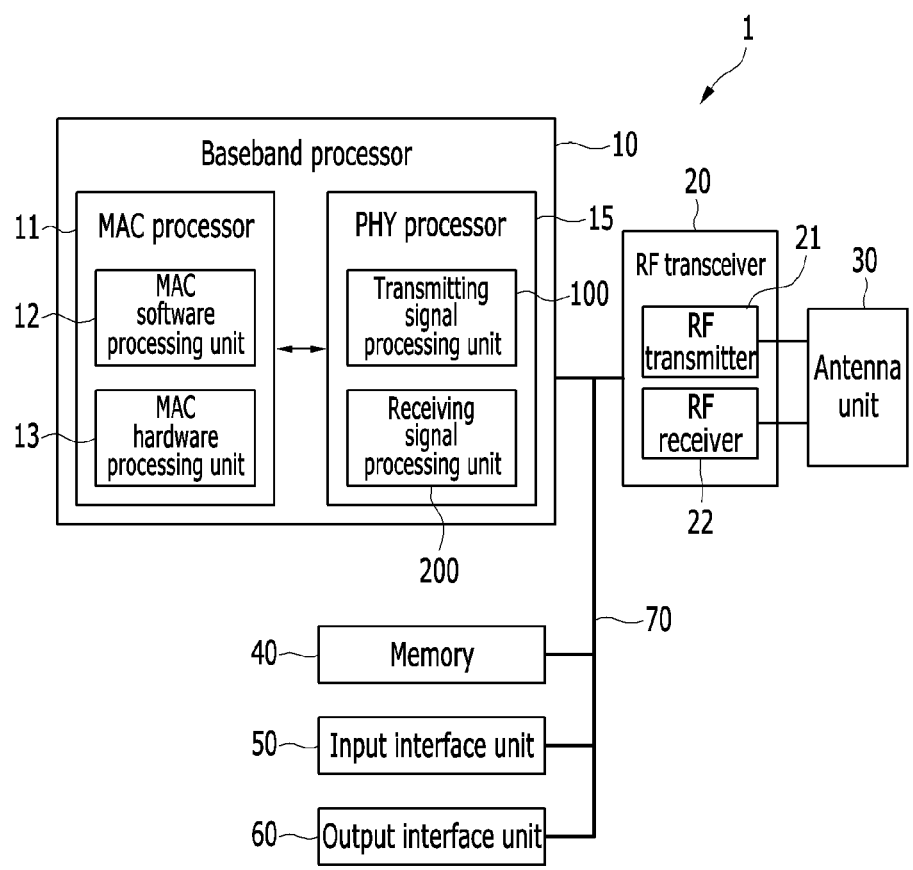
FIG. 1 is a schematic block diagram of a WLAN device according to an embodiment.

In the following detailed description, only certain embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. The plurality of WLAN devices may include a WLAN device that is an access point and the other WLAN devices that are non-AP stations (non-AP STAs). Alternatively, all of the plurality of WLAN devices may be non-AP STAs in ad-hoc networking. In general, the AP STA and the non-AP STA may be collectively called the STAs. However, for ease of description, herein, only the non-AP STA are referred to as the STAs.

FIG. 1 is a schematic block diagram exemplifying a WLAN device according to an embodiment.

Referring to FIG. 1, the WLAN device 1 includes a baseband processor 10, a radio frequency (RF) transceiver 20, an antenna unit 30, a memory 40 including non-transitory computer-readable media, an input interface unit 50, an output interface unit 60, and a bus 70.

The baseband processor 10 performs baseband signal processing, and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, the MAC processor 11 is not limited to this.

The PHY processor 15 includes a transmitting (Tx) signal processing unit 100 and a receiving (Rx) signal processing unit 200.

The baseband processor 10, the memory 40, the input interface unit 50, and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
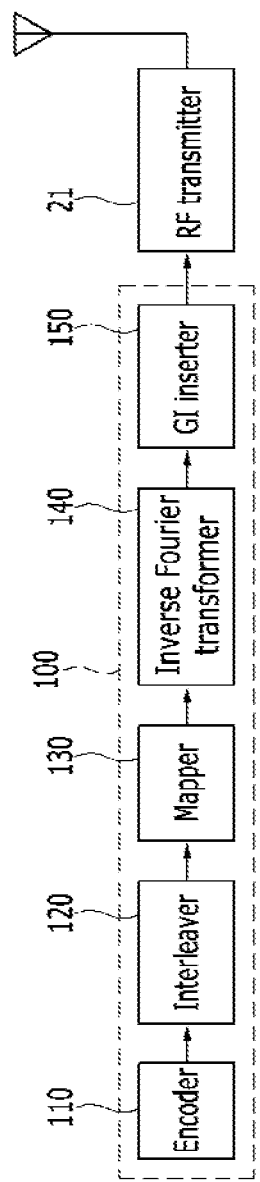
FIG. 2 is a schematic block diagram of a transmitting signal processor in an embodiment suitable for use in a WLAN.

FIG. 2 is a schematic block diagram of a transmitting signal processor 100 in an embodiment suitable for use in a WLAN.

Referring to FIG. 2, a transmitting signal processing unit 100 includes an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change an order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers 130 corresponding to a number of spatial streams $N_{SS}$. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a guard interval (GI) to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
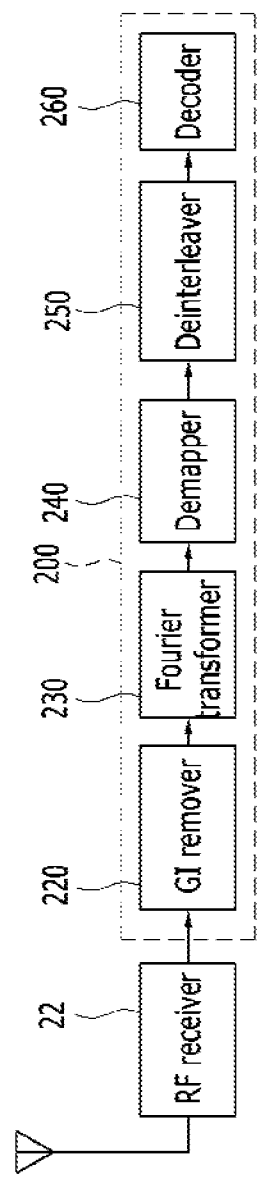
FIG. 3 is a schematic block diagram of a receiving signal processing unit in an embodiment suitable for use in the WLAN.

FIG. 3 is a schematic block diagram of a receiving signal processing unit according to an embodiment suitable for use in the WLAN.

Referring to FIG. 3, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into a symbol. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may include a spatial demapper for converting the Fourier transformed received symbols to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
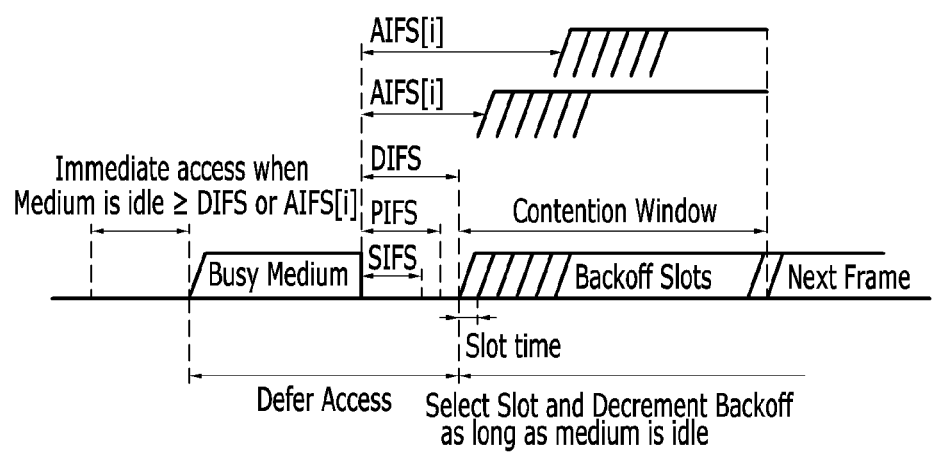
FIG. 4 exemplifies illustrates Inter-Frame Space (IFS) relationships.

FIG. 4 illustrates interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. When the control frame is not a response frame of a previous frame, the WLAN device transmits the control frame after performing backoff when the DIFS has elapsed. When the control frame is the response frame of a previous frame, the WLAN device transmits the control frame without performing backoff when a short IFS (SIFS) has elapsed. The type and subtype of a frame may be identified by a type field and a subtype field in a frame control field.

On the other hand, a Quality of Service (QoS) STA may transmit the frame after performing backoff when an arbitration IFS (AIFS) for access category (AC), i.e., AIFS[AC], has elapsed. In this case, the data frame, the management frame, or the control frame which is not the response frame may use the AIFS[AC].

Figure 5:
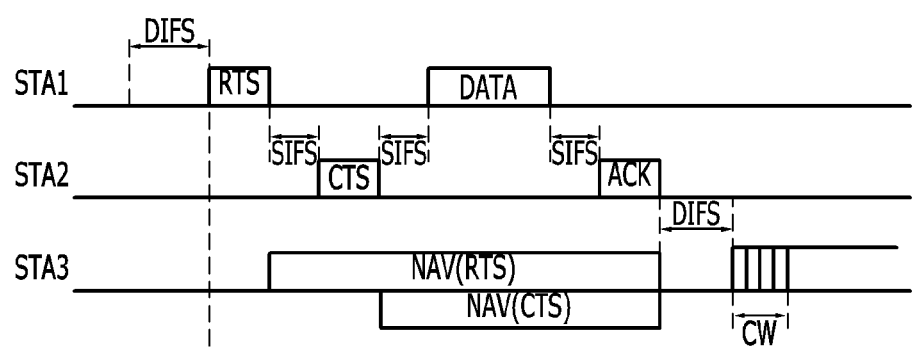
FIG. 5 is a schematic diagram illustrating a CSMA/CA based frame transmission procedure for avoiding collision between frames in a channel.

FIG. 5 is a schematic diagram illustrating a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data, and STA3 is a third WLAN device which may be located at an area where a frame transmitted from the STA1 and/or a frame transmitted from the STA2 can be received by the third WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When it is determined that the channel is not in use by other devices during DIFS (that is, that the channel is idle), the STA1 may transmit an RTS frame to the STA2 after performing backoff. Upon receiving the RTS frame, the STA2 may transmit a CTS frame as a response of the CTS frame after a SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. For example, the NAV timer may be set for a duration of SIFS+CTS frame duration+SIFS+data frame duration+SIFS+ACK frame duration. When the STA3 receives the CTS frame, it may set the NAV timer for a transmission duration of subsequently transmitted frames (for example, a duration of SIFS+data frame duration+SIFS+ACK frame duration) by using duration information included in the RTS CTS frame. For example, the NAV timer may be set for a duration of SIFS+data frame duration+SIFS+ACK frame duration. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after a SIFS elapses.

When the NAV timer expires, the STA3 may determine whether the channel is busy by the carrier sensing. Upon determining that the channel is not in use by the other devices during DIFS after the NAV timer has expired, the STA3 may attempt the channel access after a contention window according to random backoff elapses.

Hereinafter, the PHY transmit and receive procedures are described. For an explanation of the procedures, the VHT (very high throughput) PPDU (PHY Protocol Data Unit) is used. Naturally, the PHY transmit/receive procedure may generate/receive various formats such as high efficiency (HE) frame formats, and further operate additional functions such as MU-MIMO, Low density parity check (LDPC) or Space Time Block Code (STBC).

Figure 6:
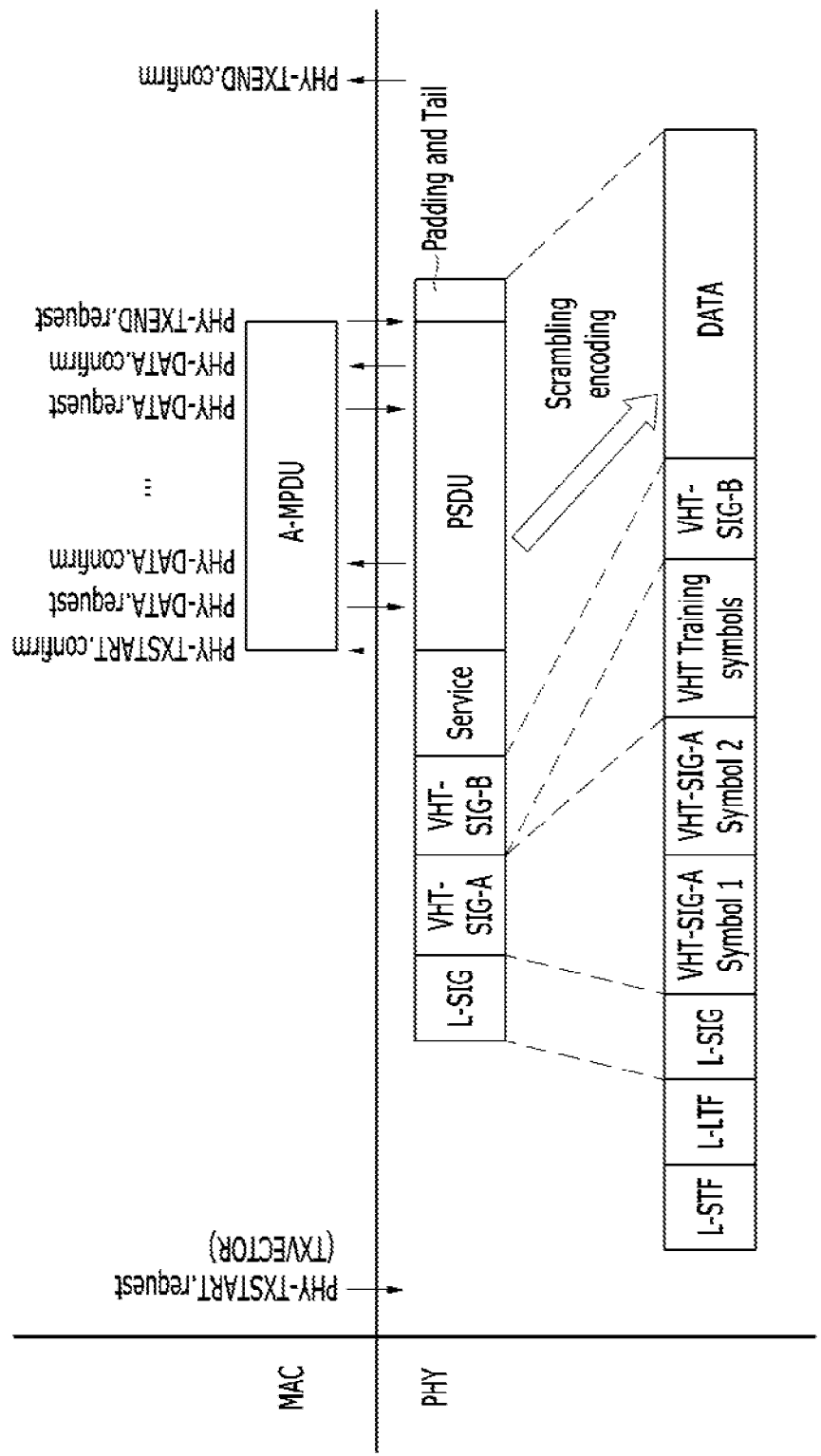
FIG. 6 exemplifies a PHY transmit procedure.

FIG. 6 exemplifies a PHY transmit procedure.

Referring to FIG. 6, the MAC Protocol Data Unit (MPDU)/the Aggregated MPDU (A-MPDU)(MAC frame) is transferred from MAC (Media Access Control) layer to PHY (physical) layer. The MPDU/the A-MPDU transferred to the PHY layer is the Physical Service Data Unit (PSDU) at the PHY layer. The PHY layer adds a service field and padding/tail bits to the PSDU and generates the DATA field.

The PHY layer generates the PPDU by adding a legacy short training field (L-STF), a legacy long training field (L-LTF), a legacy signal field (L-SIG), a VHT-SIG-A field, a VHT-STF/LTF, and a VHT-SIG-B field to the DATA field. The L-STF, the L-LTF, and the L-SIG are a legacy part to carry signal information for the compatibility with previous version WLAN devices. The L-STF and the L-LTF may be used for synchronization and channel estimation. The L-SIG may include signaling information such as length information representing a length of the entire frame and rate information. The VHT-SIG-A field may include control information required to interpret the received PPDU at the receiver.

The VHT-SIG-A field having two symbols follows the L-SIG field. The VHT-SIG-A field includes the channel bandwidth information used for transmitting the PPDU, a space time block code (STBC) information, Group ID, Single User (SU)/Multi User (MU) information, beamforming information and so on.

The PHY layer generates the PPDU (PHY frame) based on TXVECTOR issued by the MAC layer. The PHY layer inserts the control information to the signal fields. The TXVECTOR represents a list of parameters which the MAC layer provides to the PHY layer.

Specifically, for data transmission, the MAC layer generates a PHY-TXSTART.request (TXVECTOR) primitive, which causes the PHY layer entity to enter the transmit state. The PHY layer is set to operate at the appropriate frequency via the PHY Layer Management Entity, PLME. Other transmit parameters are set via the PHY-SAP using the PHY-TXSTART.request (TXVECOTR) primitive.

The PPDU transmission is initiated by the PHY layer after receiving the PHY-TXSTART.request (TXVECOTR) primitive. After the PHY preamble transmission is started, the PHY layer entity initiates data scrambling and data encoding. The DATA field is encoded based on the FEC_COD- ING, CH_BANDWIDCH, NUM_STS, STBC, MCS, and NUM_USERS parameters of the TXVECOTR.

The data is exchanged between the MAC layer and the PHY layer through a series of PHY-DATA.request (DATA) primitives issued by the MAC layer, and PHY-DATA.confirm primitives issued by the PHY layer.

The PSDU transmission is terminated by receiving a PHY-TXEND.request primitive issued by the MAC layer. When the transmission is completed, the PHY entity enters the receive state.

Figure 7:
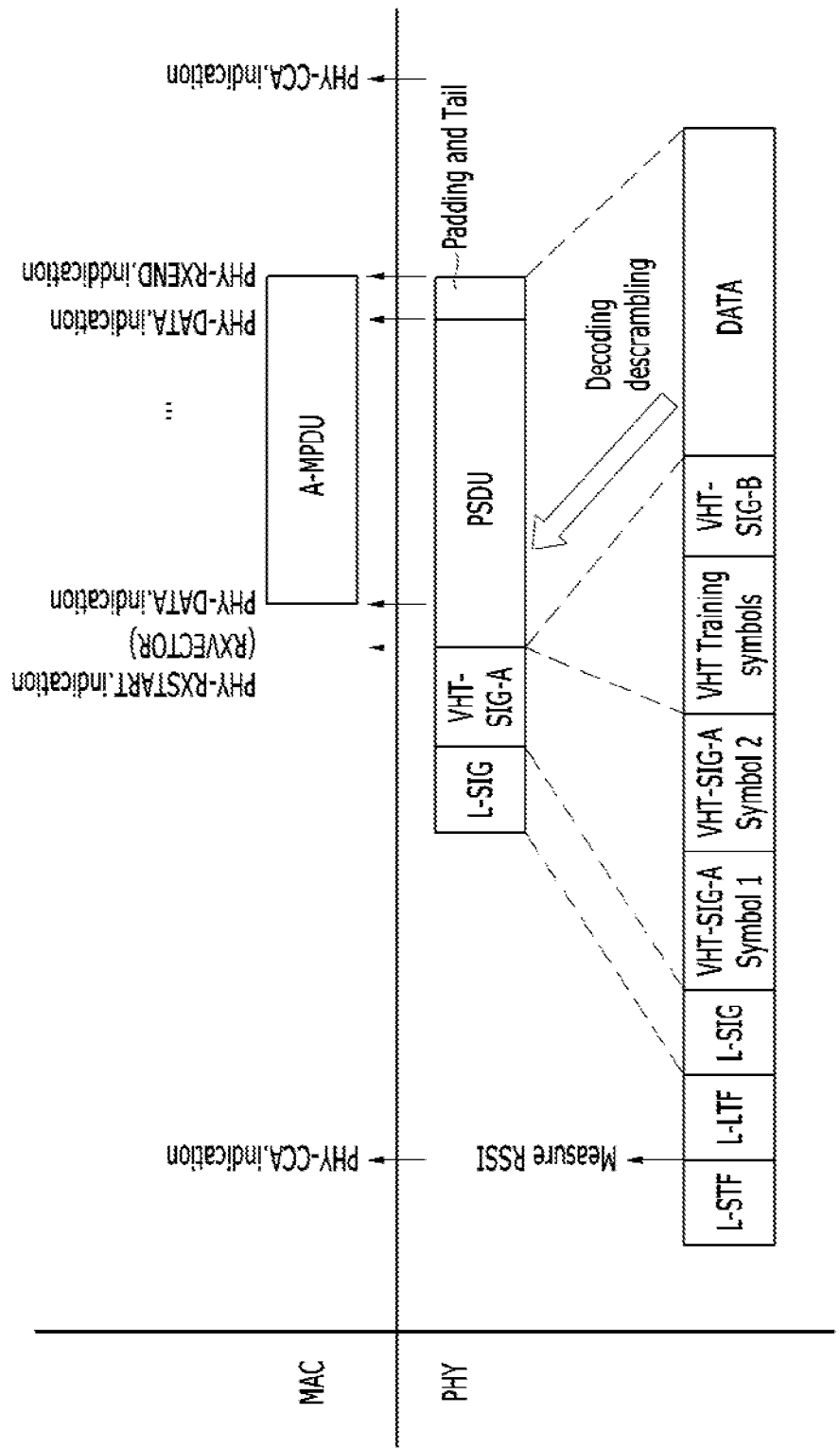
FIG. 7 exemplifies a PHY receive procedure.

FIG. 7 exemplifies a PHY receive procedure.

Referring to FIG. 7, the PPDU transmitted from the transmitter is received at a receiver.

Specifically, for data reception, the PHY layer receives the PHY preamble, and measures the received signal strength (RSS). Then the PHY layer indicates the RSS to the MAC layer via the PHY-CCA.indication primitive.

After the PHY-CCA.indication primitive is issued, the PHY layer entity begins receiving the training symbols and searching for the L-SIG in order to set the duration of the data stream. After receiving a valid L-SIG and VHT-SIG-A, the PHY layer receives the VHT training symbols and the VHT-SIG-B.

If the received group ID in the VHT-SIG-A field indicates the SU-MIMO, the PHY layer does not decode the VHT-SIG-B field. If the received group ID indicates the MU-MIMO, the PHY layer decodes the VHT-SIG-B field. If the VHT-SIG-B field is decoded, the PHY layer checks the CRC bit sequences.

After the VHT-SIG-B field decoding, if the VHT-SIG-B CRC is valid, the PHY layer issues the PHY-RXSTART.indication (RXVECTOR) primitive to the MAC layer. The RXVECTOR represents a list of parameters which the PHY layer provides to the MAC layer. The RXVECTOR includes the control information included in the signal fields. The MAC layer may obtain the data using the RXVECTOR.

The PHY layer transfers the received PSDU to the MAC layer via the PHY-DATA.indication primitive. The PHY layer issues the PHY-RXEND.indication to the MAC layer and terminates the PSDU transmission. Then the PHY layer sets the PHY-CCA.indication (IDLE) primitive, and returns to the RX IDLE state.

The IEEE 802.11ax standard for the high efficiency WLAN requires robustness in outdoor channels, higher indoor efficiency. The IEEE 802.11ax standard includes the technology of UL (Up Link)/DL (Down Link) MU-MIMO and UL/DL OFDMA to achieve the high efficiency.

In DL MU transmission, an AP as a source transmits the same packet to STAs. Therefore, single carrier frequency offset (CFO) and timing offset are needed to interpret the receive packet at each of the STAs. However, in UL MU transmissions, the STAs as multiple sources transmit their own packets to one destination, the AP. The each of the packets transmitted from the STAs has a different CFO, a different timing offset, and a different power level. These mismatches cause the performance degradation at the AP.

Hereinafter, the method for carrier frequency offset (CFO) and sampling frequency offset (SFO) pre-compensation at a transmitter, transmission timing adjustment and transmit power control is described as below. The present disclosure may avoid or minimize the degradation at the AP. It is assumed that an AP, a STA, a transmitter or a receiver may be a wireless device supporting high efficiency (HE) WLAN (hereinafter, referred to as a "HE device") being developed by the IEEE 802.11ax.

Figure 8:
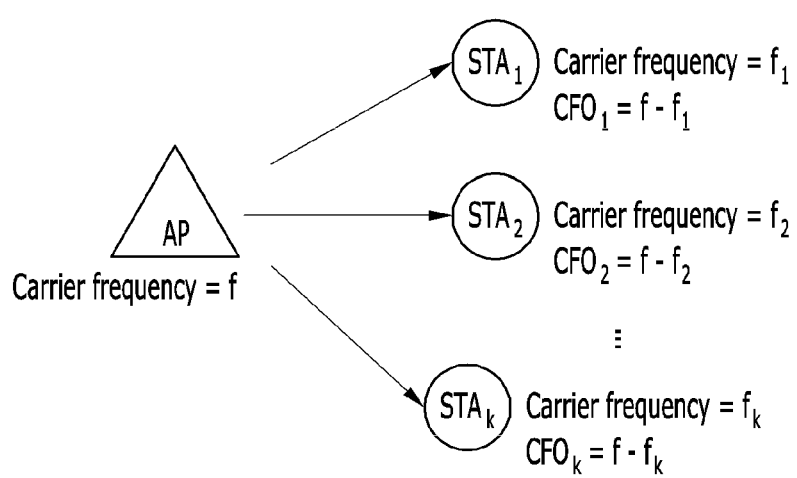
FIG. 8 shows a CFO estimation method according to an embodiment of the present disclosure.
Figure 9:
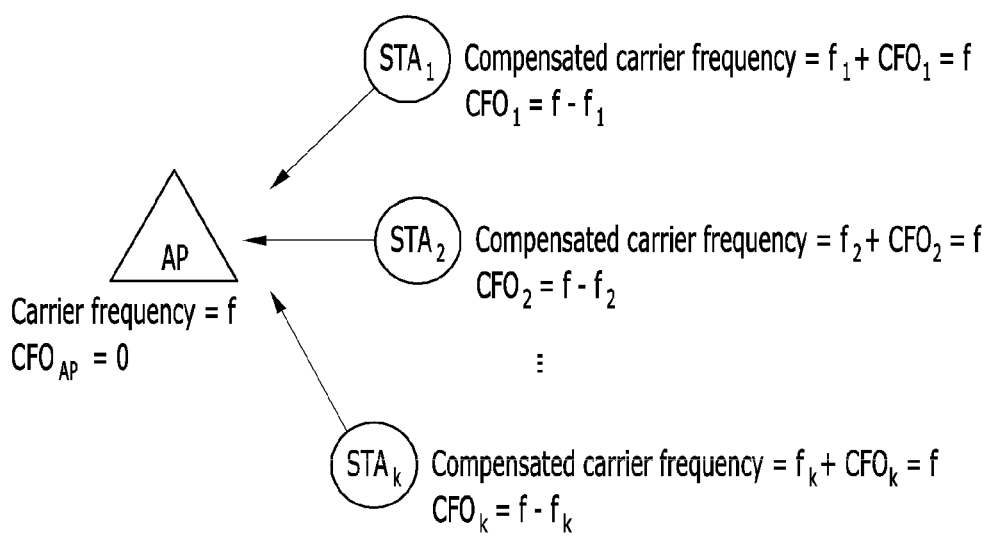
FIG. 9 shows a CFO pre-compensation method according to an embodiment of the present disclosure.

FIG. 8 shows a CFO estimation method according to an embodiment of the present disclosure, and FIG. 9 shows a CFO pre-compensation method according to an embodiment of the present disclosure.

Referring to FIG. 8, a wireless communication network may include an AP and a plurality of STAs, (STA$_1$, STA$_2$, . . . , STA$_k$). It is assumed that the carrier frequencies of the AP and the STAs are "f", "f$_1$", "f$_2$", . . . , "f$_k$", respectively. The different carrier frequencies may be caused by the non-identical hardware products on board or various reasons.

The AP may transmit to the STAs a trigger frame that coordinates an uplink multiuser transmission. Each of the STAs initiates the UL transmission after the reception of the trigger frame. The trigger frame is sent by the AP and the Transmit Opportunity (TXOP) for UL transmission will start. The trigger frame may be one of the various transmit frames.

Each STA may estimate the carrier frequency offset (CFO) with training symbols of the L-STF the L-LTF, and track the frequency offset with pilots in each DATA OFDM symbols or other fields. The CFO$_k$ which is estimated at the STA$_k$ has the value of "f−f$_k$".

Referring to FIG. 9, the STA$_k$ may compensate the own carrier frequency "f$_k$" by using the CFO estimate, "CFO$_k$". The compensated carrier frequency becomes the frequency "f$_k$+CFO$_k$" which is the same to the AP's carrier frequency "f". Each STA transmits the UL packet to the AP by using the compensated carrier frequency "f". Upon the CFO pre-compensation at each of the UL STAs, the AP may receive the UL packets having the same carrier frequency "f".

The PHY layer may calculate the CFO value using the receive frame. The PHY layer can pre-compensate the carrier frequency by using the known CFO value by itself, without any aid of the MAC layer. Meanwhile, the PHY layer does not confirm a proper CFO value corresponding to a transmit frame, and just apply the known CFO value to the transmit frame. Therefore, the pre-compensation may be valid when the PHY layer receives a first frame from a source (e.g., the AP), calculates a CFO value from the first frame, and then transmit a second frame compensated by the CFO value to the source (e.g., the AP) in turn.

In various wireless communication environments, it is not guaranteed that a STA always transmits the UL frame to the AP right after receiving the UL trigger frame from the AP. In some cases, the STA can transmit multiple UL frames without receiving any UL trigger frame from the AP. In another case, the packets from neighboring Basic Service Set (BSS) may interrupt a normal frame exchange. The PHY layer may receive a plurality of frames, and estimate the CFO values corresponding to the plurality of receive frames respectively. In these various conditions, the PHY layer cannot identify the transmitter because an identifier of the transmitter, i.e., IP address, is in the MAC header of the receive frame. Therefore, the PHY layer has no information to relate the estimated CFO value and the device sending the receive frame. The PHY layer cannot determine a proper CFO value for pre-compensating before transmitting a frame to a designated device.

As such, the PHY layer may estimate the CFO value using a recent receive frame, and simply apply the known CFO value to a current transmit frame without considering a proper CFO value to the transmit frame. Therefore, a previous carrier compensation method implemented only in the PHY layer has a limitation to perform the CFO and the SFO pre-compensation with the proper CFO value in various wireless communication environments.

Hereinafter, the present disclosure describes the methods to apply a proper CFO value with an aid of a MAC layer when transmitting an UL frame.

The methods that the PHY layer identifies the transmit frame required the CFO and the SFO pre-compensation via RXVECTOR and TXVECTOR, and transmits the CFO and the SFO pre-compensated frame by using the CFO estimate are described as the present disclosure.

Figure 10:
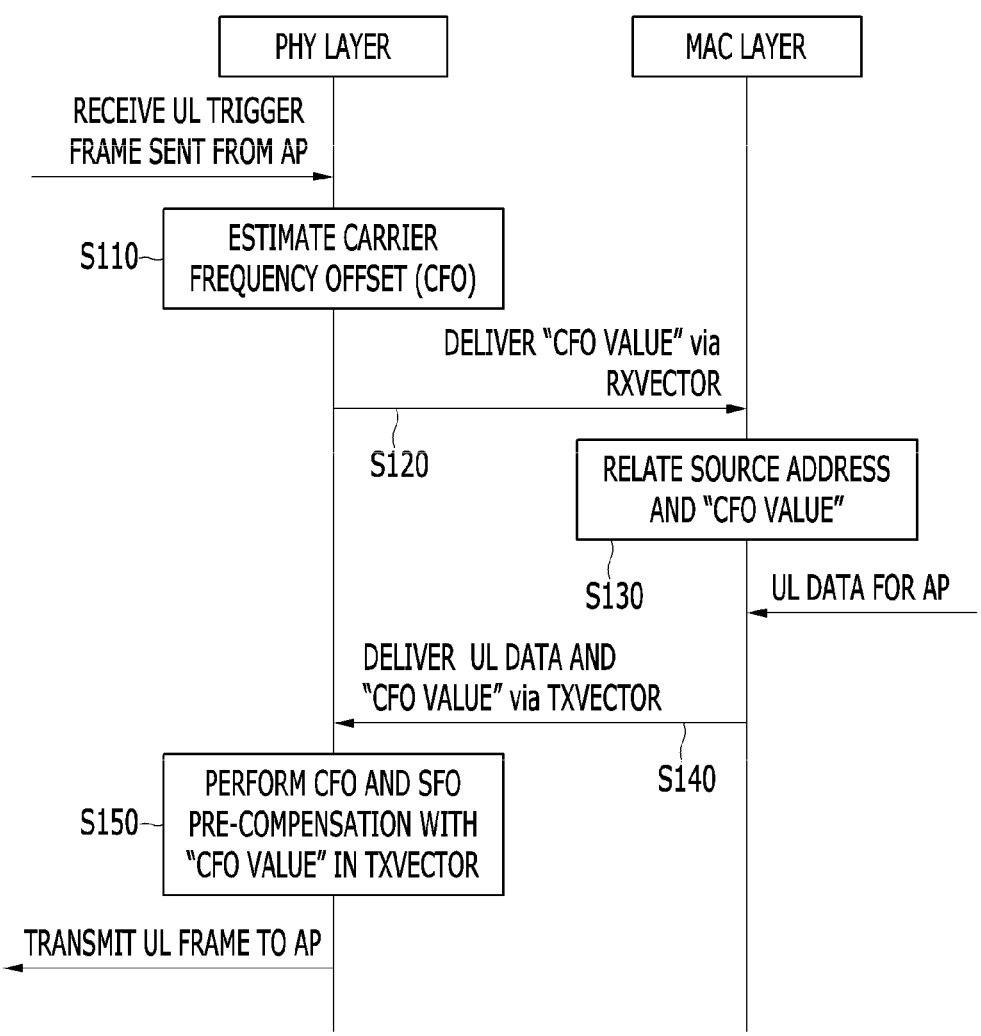
FIG. 10 is a flow chart illustrating a method for CFO and SFO pre-compensation according to an embodiment of the present disclosure.

FIG. 10 is a flow chart illustrating a method for CFO and SFO pre-compensation according to an embodiment of the present disclosure.

Referring to FIG. 10, the PHY layer of a $STA_i$ may estimate the CFO based on the received UL trigger frame (S110). The CFO value may be calculated to the value of "$f-f_i$", where the frequency "f" is the carrier frequency of the transmitter and the frequency "$f_i$" is the carrier frequency of the $STA_i$.

The PHY layer may deliver the CFO value to the MAC layer, via a RXVECTOR (S120). The PHY layer may decode the payload of the receive frame, and may deliver the decoded payload with additional information, via the RXVECTOR. The additional information includes the Received Channel Power Indicator (RCPI) and the control information of the signal fields, and further includes the CFO value. That is, the CFO value is delivered to the MAC layer via the RXVECTOR.

The MAC layer may relate the source address of the receive frame based on a MAC header decoding and the CFO value associated the receive frame in the RXVECTOR (S130). First, the MAC layer may confirm the source address of the receive frame based on the MAC header decoding. Then, the MAC layer may store the CFO value in the RXVECTOR as the CFO value related to the confirmed source address. If the receive frame is a UL trigger frame sent from the AP, the CFO value in the RXVECTOR is stored as a parameter related to the AP in the MAC layer. Here, the source address is used as an example of an identifier of a transmitter sending the receive frame. Other information representing a transmitter/receiver may be understandably used as the identifier.

For UL transmission to the AP, the MAC layer may deliver the UL data and the CFO value for the AP to the PHY layer, via a TXVECTOR (S140). For transmitting UL data to the AP, the MAC layer may find the CFO value related to the AP and insert the CFO value to the TXVECTOR.

The PHY layer may perform a CFO and SFO pre-compensation with the CFO value in the TXVECTOR (S150). If non-zero CFO value is indicated in the TXVECTOR, the PHY layer compensates the carrier frequency and the sampling frequency before transmitting the UL frame to the AP.

The PHY layer may transmit the UL frame pre-compensated the CFO and the SFO (S160). The SFO value is obtained from the CFO value.

As such, the PHY layer performs the CFO and the SFO pre-compensation for the UL transmission with the CFO value in the TXVECTOR. That is, the PHY layer performs the CFO and the SFO pre-compensation with an aid of the MAC layer delivering the TXVECTOR.

Figure 11:
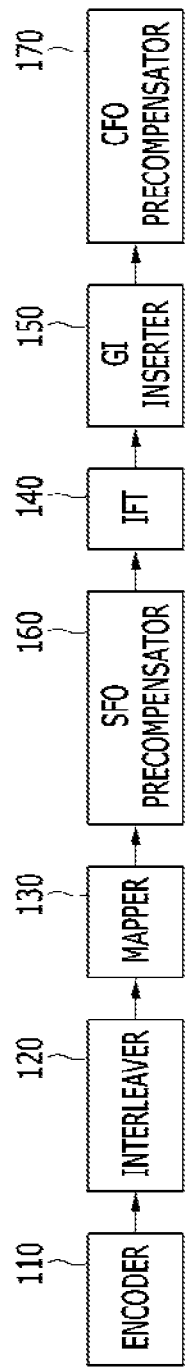
FIG. 11 is a block diagram of transmitter for CFO and SFO pre-compensation according to an embodiment of the present disclosure.
Figure 12:
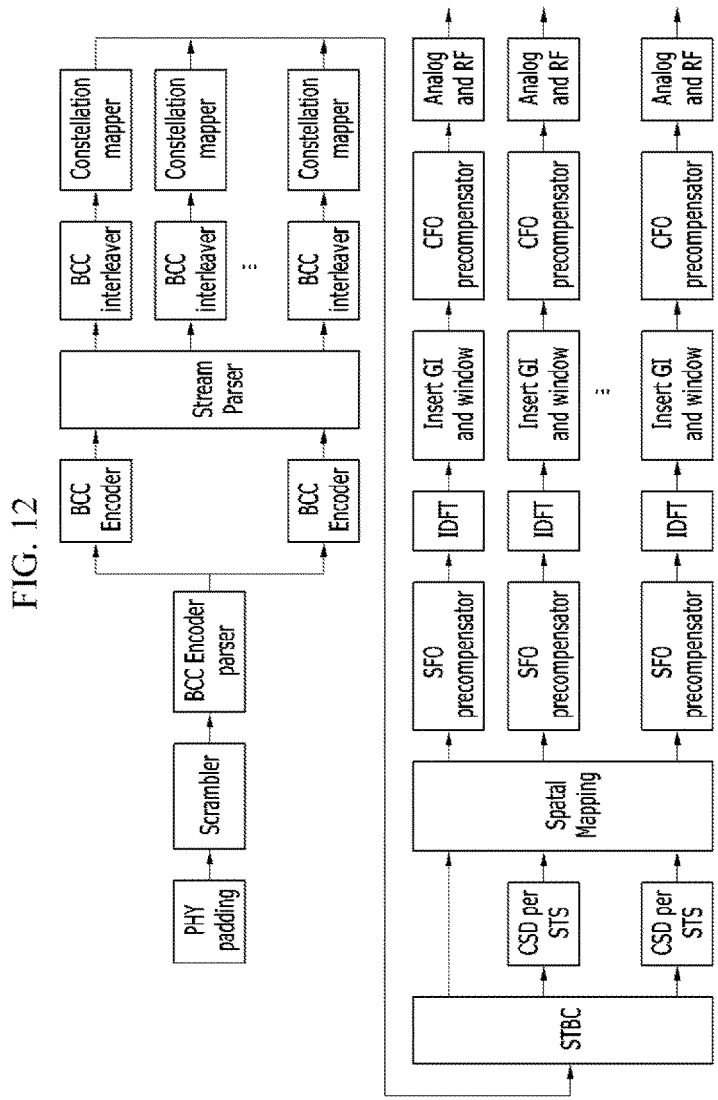
FIG. 12 is an example of transmitter for CFO and SFO pre-compensation according to an embodiment of the present disclosure.

FIG. 11 is a block diagram of transmitter for CFO and SFO pre-compensation according to an embodiment of the present disclosure, and FIG. 12 is an example of transmitter for CFO and SFO pre-compensation according to an embodiment of the present disclosure.

Referring to FIG. 11, a transmitting signal processing unit (referring to FIG. 2) of a transmitter includes an encoder 110, an interleaver 120, a mapper 130, an inverse Fourier transformer (IFT) 140, and a guard interval (GI) inserter 150, and further includes a SFO pre-compensator 160 and a CFO pre-compensator 170. For example, a transmitting signal processing unit may be implemented with a BCC encoding and a space time block code (STBC) encoding, as shown in FIG. 12.

The SFO pre-compensator 160 may be implemented before the IFT 140. The SFO pre-compensation may be applied in frequency domain. The SFO is an incremental phase in frequency domain if the accumulated offset does exceed the sample boundary. That is, the SFO is in fractional sample level. Therefore, the SFO pre-compensation is done in frequency domain. When the accumulated time offset exceeds one sample, one sample is added or deleted in the GI inserter 150.

The CFO pre-compensator 170 may be implemented after the IFT 140 and the GI inserter 150. Because the CFO is an incremental phase in time domain, the CFO pre-compensation is applied in time domain.

When the MAC layer of a $STA_i$ delivers the UL data to the PHY layer via the TXVECTOR, the PHY layer starts the scrambling and the encoding process. The CFO value in the TXVECTOR is used in the SFO pre-compensator 160 and the CFO pre-compensator 170.

The CFO pre-compensator 170 compensates the carrier frequency using the CFO value included in the TXVECTOR.

The SFO pre-compensator 160 compensates the sampling frequency using the SFO value. The SFO value is obtained from the CFO value. The carrier frequency and the sampling frequency of a wireless communication device are generated with the same oscillator. Upon the same oscillator, the SFO is calculated from the CFO value if the carrier frequency (channel frequency) is known. If the CFO value is defined as an incremental phase between two consecutive samples in time domain, the SFO value is given by Equation 1. This detail equation may be different depending on the implementation.

$$SFO=CFO*\Delta f*(f_o/f_c)*T_{OFDM} \quad \text{(Equation 1)}$$

In the Equation 1, "$\Delta f$" denotes subcarrier spacing. "$f_o$" denotes an operating frequency for CFO estimation, which is an inverse of sample duration. "$f_c$" denotes a carrier frequency of the STA. "$T_{OFDM}$" denotes an OFDM symbol duration.

The present disclosure defines a parameter of the RXVECTOR and the TXVECTOR for the CFO and the SFO pre-compensation.

Referring to the Table 1, the RXVECTOR and the TXVECTOR include a parameter, "CFO_value". The "CFO_value" parameter in the RXVECTOR indicates the CFO value estimated in the receiver operation. The "CFO_value" parameter in the TXVECTOR indicates the CFO_value pre-compensated in a transmit operation. The "CFO_value" parameter in the RXVECTOR and the TXVECTOR is applied to the HE device.

TABLE 1

| Parameter | Condition | Value | TXVECTOR | RXVECTOR |
|---|---|---|---|---|
| CFO_value | FORMAT is HE | This in RXVECTOR indicates the | Y | Y |

TABLE 1-continued

| Parameter | Condition | Value | TXVECTOR | RXVECTOR |
|---|---|---|---|---|
| | | value of CFO estimated in the receiver. This in TXVECTOR indicates the value of CFO pre-compensated in a transmitter. | | |
| | Otherwise | Not present | N | N |

Referring to Table 2, the CFO value may be defined as Management Information Base (MIB) for PHY layer of a HE device.

TABLE 2 dot11PHYHETable

| Managed Object | Default value/range | Operational semantics |
|---|---|---|
| dot11CFOSFOprecompensationActivated | False/Boolean | Dynamic |
| dot11CFOvalue | Implementation dependent | Dynamic |

Based on the MIB of the Table 2, the PHY layer performs the CFO and the SFO pre-compensation. When "dot11CFOSFOprecompensationActived" is true, the SFO pre-compensator 160 and the CFO pre-compensator 170 perform the pre-compensation with the value of "dot11CFOvalue" which is the CFO value.

Upon the UL data transmission, the MAC-PHY interface signaling with the TXVECTOR and the RXVECTOR is described as below.

In the receiving operation, the PHY layer estimates the CFO value with the UL trigger frame transmitted from an AP. The PHY layer delivers the CFO value via the RXVECTOR including the parameter, "CFO_value".

The MAC layer knows the CFO value estimated in the receiver operation by the "CFO_value" parameter in the RXVECTOR.

Based on the source address of the receive frame, the MAC layer determines to use the CFO value for the pre-compensation if the receive frame is the UL trigger frame. The MAC layer may ignore the CFO value if the receive frame is not the UL trigger frame transmitted from the AP.

In the transmitting operation, the MAC layer delivers the TXVECTOR with the UL data to inform the proper CFO value to the PHY layer.

The PHY layer operates according to the CFO value of the TXVECTOR. If the CFO value is non-zero, the CFO value is used for the CFO and SFO pre-compensation. That is, if "dot11CFOSFOprecompensationActivated" is true "dot11CFOvalue" is used for the CFO and SFO pre-compensation.

In the PHY layer, the carrier frequency of the STA is compensated to the carrier frequency of the AP with the non-zero CFO value. In the PHY layer, the sampling frequency of the STA is compensated by the SFO value calculated from the non-zero CFO value, as referring to Equation 1.

In detail, the transmit samples are rotated with an incremental phase of "−CFO", i.e., "−CFO*t", where "t" is a sample time index. The timing offset at a given sample time index t, is "SFO*t". Then the pre-compensation value becomes the value of "−SFO*t". If the accumulated timing offset "−SFO*t" does not exceed the half of sample duration to be in the range of [−0.5, +0.5], the frequency domain compensation is enough.

The SFO pre-compensation in the frequency domain is phase rotation of "−SFO*t*k", where "k" denotes a subcarrier index. That is, the SFO pre-compensation is the ration of incremental phase in frequency domain with a subcarrier index.

If the accumulated timing offset "−SFO*t" exceed the half of sample duration, one sample of the IFT 140 output is added or deleted in the GI inserter 150. The phase of the SFO pre-compensation is corrected by subtracting or adding 0.5 to "−SFO*t−0.5" or "−SFO*t+0.5".

So far, the CFO and SFO pre-compensation method for UL transmission is described. According to embodiments, the AP receives all UL MU packets synchronized in terms of the CFO and the SFO, and avoids the performance degradation caused by the frequency offset.

Hereinafter, an efficient padding method applied to the last OFDM symbol is described.

For the next generation of WLAN, a method for enhancing the system throughput in high density scenarios is being developed by the IEEE 802.11ax. The IEEE 802.11ax requires robustness in outdoor channels, higher indoor efficiency. In the IEEE 802.11ax, 4 times longer OFDM symbol of which the duration excluding GI is 12.8 us is defined for outdoor operation and obtaining narrower subcarrier spacing. However, in cases of short packet transmission, lots of padding bits are required to fill out all tones in the last OFDM symbol. Therefore, efficient padding scheme is needed for IEEE 802.11ax.

FIG. 13 exemplifies a frame format of a wireless communication network according to embodiments of the present disclosure.

Referring to FIG. 13, a frame according to an embodiment of the present disclosure includes a legacy preamble part and a part supporting a wireless communication network according to an embodiment of the present disclosure, for example a HE compatible part.

The legacy preamble part includes a legacy preamble for backward compatibility with previous version WLAN devices. The legacy preamble includes an L-STF, an L-LTF, and an L-SIG. The L-SIG may include signaling information such as length information representing a length of the entire frame and rate information.

The HE compatible part includes a HE preamble and a data field. The data field includes data to be transmitted, and the data may correspond to a MAC frame.

The HE preamble includes a HE signal field (HE-SIG-A) following the L-SIG and carries signaling information for a HE device. The HE preamble may further include an additional HE signal field (HE-SIG-B).

The HE preamble may further include a HE long training field (HE-LTF). The HE-LTF may be used for channel estimation of the HE compatible part. The HE-LTF may include a plurality of HE-LTFs.

The HE preamble may further include a HE short training field (HE-STF). The HE-STF may be used for automatic gain control of the HE compatible part and precede the HE-LTF.

Figure 14:
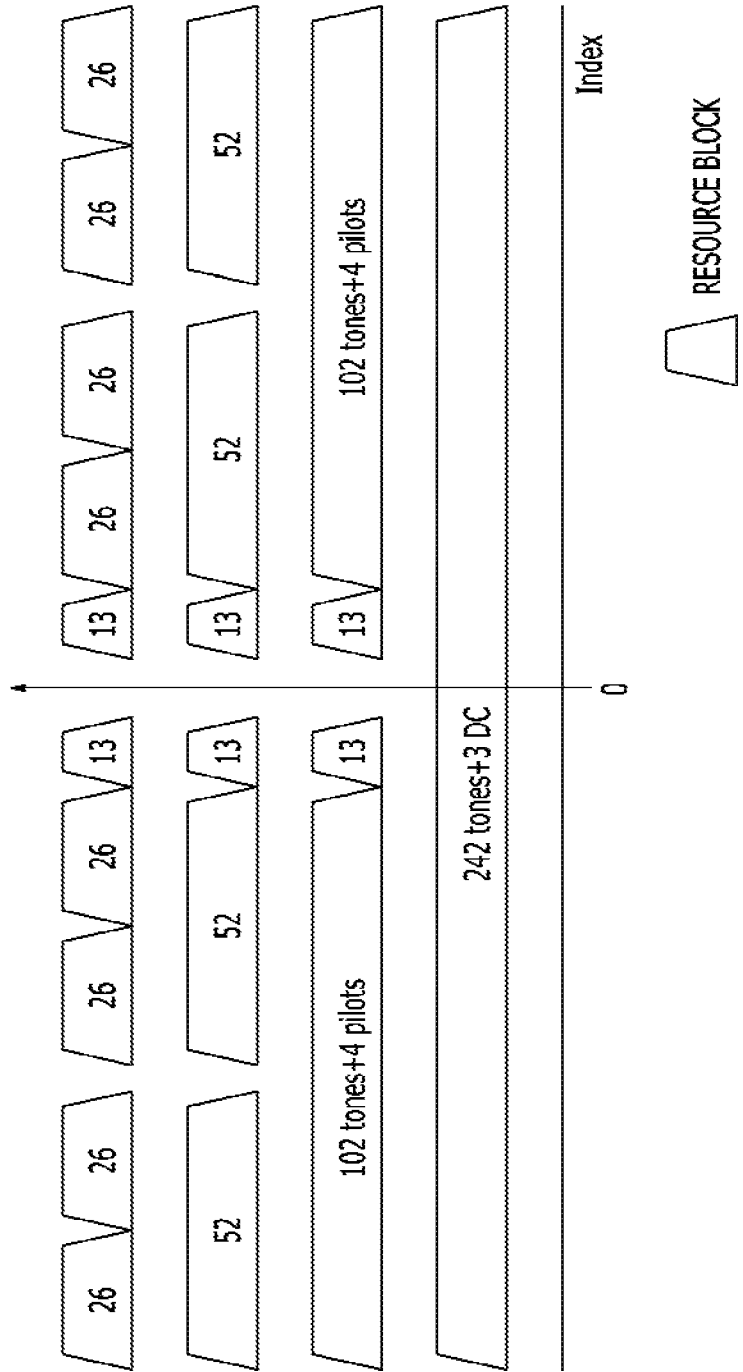
FIG. 14 exemplifies transmission resource blocks with subcarriers on 20 MH bandwidth.

FIG. 14 exemplifies transmission resource blocks with subcarriers on 20 MH bandwidth.

Referring to FIG. 14, a plurality of subcarriers may be allocated on a symbol in frequency domain. When a 256 FFT is applied to a 20 MHz bandwidth, 256 subcarriers are allocated on one symbol. When the 20 MHz bandwidth is divided into a plurality of subbands and the 256 FFT is applied to the 5 MHz subband, 64 subcarriers can be disposed on one symbol. When the 256 FFT is applied to the 10 MHz subband, 128 subcarriers can be disposed on one symbol.

A center subcarrier among the plurality of subcarriers may be used as a DC (direct current) tone. An index of the DC tone is "0". Subcarriers that are disposed on both sides of the DC tone may be also used as DC tones. Some subcarriers that are disposed on both ends with the DC tone as the center may be used as guard tones. Remaining subcarriers that exclude the DC tones and the guard tones from entire subcarriers may be used as data tones. When pilots are transmitted, some of the data tones may be used as pilot tones for transmitting the pilots.

The different OFDM numerology in different resource bandwidth (blocks) for OFDMA operation on 20 MH bandwidth are used in the IEEE 802.11ax. It is assumed that the resource block including 24 data tones and 2 pilots, the resource block including 48 data tones and 4 pilots, the resource block including 102 data tones and 4 (or 6) pilots, and the resource block including 234 data tones and 8 pilots are used.

Hereinafter, an OFDM symbol which is applied the 256 FFT on the 20 MHz bandwidth is used for an explanation to the present disclosure. The extension to another bandwidth, the different numbers of data subcarriers, interleaver sizes and so on can be considered. Additionally, the extension to the OFDMA carrier can also be considered.

Figure 15:
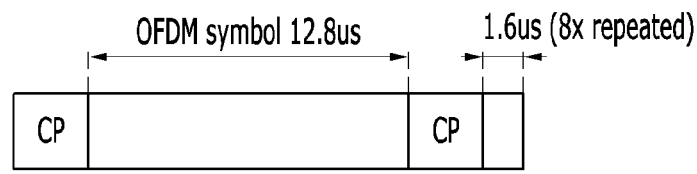
FIGS. 15 (a) to 15 (d) show OFDM symbol structures of the last two symbols according to an embodiment of the present disclosure.
Figure 15:
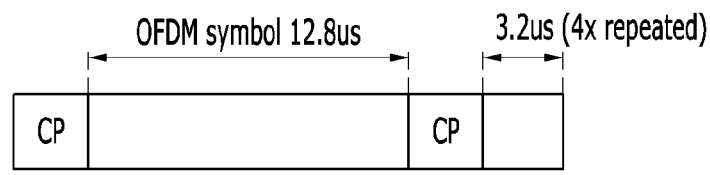
Figure 15:
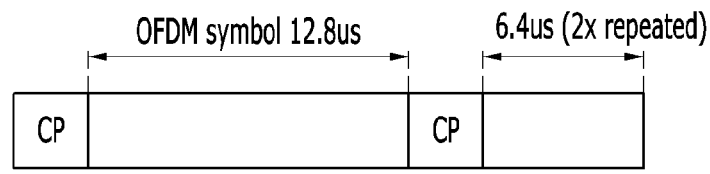
Figure 15:
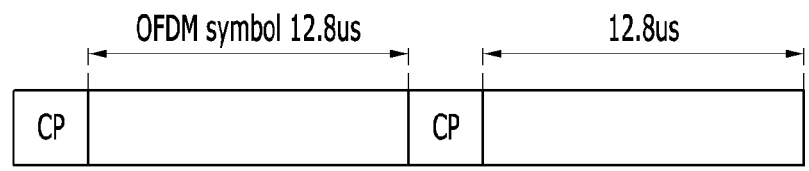

FIG. 15 shows OFDM symbol structures of the last two symbols according to an embodiment of the present disclosure.

According to a conventional OFDM modulation, the last symbol may be padded some bits to fill out the whole data subcarriers when the number of bits to transmit in the last symbol is less than the number of data bits per symbol, $N_{DBPS}$. The padding bits are added in MAC and PHY layers (referring to FIG. 6).

While the 256 FFT is applied on the 20 MHz bandwidth, an OFDM symbol duration excluding GI is 12.8 us. In case, a transmitter has to transmit the whole symbol including just a few data bits as a last symbol. That is, a transmitter spends the symbol duration 12.8 us and CP duration for only a few data bits. The efficiency due to padding bits decreases in transmission of short packets. Therefore, the efficient padding method is needed especially to use the longer OFDM symbol with narrower subcarrier spacing.

For the efficient padding method, the different padding structures are defined according the payload size, are applied in the last symbol. A transmitter determines the OFDM subcarrier mapping methods and modulation methods based on the number of used data tones in the last symbol before the padding. Here, the used data tones mean the subcarriers used for the data transmission.

The number of used data tones in the last symbol before padding may be obtained by the payload size (the number of bytes), modulation and coding scheme (MCS), resource bandwidth, STBC option, and number of space-time streams.

Depending on the number of used data tones in the last symbol, some cases are classified. Referring to the Table 3, four cases are available in the symbol applied the 256 FFT on 20 MH bandwidth. In each case, the number of used data tones in the last symbol before padding, the number of padding bits (subcarriers), the used data tone indices, and the size of the interleaver are explained as follows.

TABLE 3

| case | Description |
|---|---|
| Case1 | the number of used data tones in the last symbol before padding ≤ 24 ($N_{d3}$) <br> Pad the dummy bits to fill 24 ($N_{d3}$) data tones <br> These tones are allocated to data subcarriers with index of 8k (k = ±1, ±2, . . .) <br> Interleaver size = 24 ($N_{d3}$) |
| Case2 | 24 ($N_{d3}$) < the number of used data tones in the last symbol before padding ≤ 48 ($N_{d2}$) <br> Pad the dummy bits to fill 48 ($N_{d2}$) data tones <br> These tones are allocated to data subcarriers with index of 4k (k = ±1, ±2, . . .) <br> Interleaver size = 48 ($N_{d2}$) |
| Case3 | 48 ($N_{d2}$) < the number of used data tones in the last symbol before padding ≤ 102 ($N_{d1}$) <br> Pad the dummy bits to fill 102 ($N_{d1}$) data tones <br> These tones are allocated to 102 ($N_{d1}$) data subcarriers with index of 2k (k = ±1, ±2, . . .) <br> Interleaver size = 102 ($N_{d1}$) |
| Case4 | 102 ($N_{d1}$) < the number of used data tones in the last symbol before padding ≤ 234 ($N_d$) <br> Pad the dummy bits to fill 234 ($N_d$) tones <br> These tones are allocated to 234 ($N_d$) data subcarriers with index of k (k = ±2, ±3, . . .) <br> (0, ±1 indexed tones are assumed to be DC tones) <br> Interleaver size = 234 ($N_d$) |

In an embodiment, the HE device may use data tones of $N_d$, $N_{d1}$, $N_{d2}$, and $N_{d3}$ and the interleavers with sizes of $N_d$, $N_{d1}$, $N_{d2}$, and $N_{d3}$, where $N_d$ is the number of total data subcarriers in a 20 MHz OFDM symbol, $N_{d3}$ is the number smaller than $N_d/8$, $N_{d2}$ is the number smaller than $N_d/4$ and $N_{d1}$ is the number smaller than $N_d/2$.

In another embodiment, the HE device may use data tones of 234, 102, 48, and 24 and the interleavers with sizes of 234, 102, 48, and 24.

Referring to FIG. 14, it is assumed that the resource blocks including 24 data tones, 48 data tones, 102 data tones, and 234 data tones are used in IEEE 802.11ax. The sizes of the interleavers are considered as following.

The size of interleaver is 24 for the resource block including 24 data tones and 2 pilots. The size of interleaver is 48 for the resource block including 48 data tones and 4 pilots. The size of interleaver is 102 for the resource block including 102 data tones and 4 (or 6) pilots. The size of interleaver is 234 for the resource block including 234 data tones and 8 pilots.

As such, the interleavers with the sizes of 24, 48, 102, and 234 are included in the HE device. Therefore, the HE device reuses the interleavers with the sizes of 24, 48, 102, and 234 to generate the transmit waveform as shown in the last symbol of FIG. 16.

For an explanation, the specific numbers of 24, 48, 102, and 234 are used for $N_{d3}$, $N_{d2}$, $N_{d1}$, and $N_d$, respectively.

Referring to FIG. 15 and Table 3, every $2^{nd}$, $4^{th}$, or $8^{th}$ subcarriers in the last symbol are used to the data tones for OFDM modulation. That is, the subcarriers with 2k, 4k, or 8k indices are used as the data tones after padding. If non-zero values are allocated to the subcarriers with 2k, 4k, or 8k indices, the transmit waveforms of the inverse Fourier transform output have the repetition property, such as two times repeated waveforms, four times repeated waveforms, or eight times repeated waveforms. To save the transmission time, the transmitter sends the only one repeated waveform (one period waveform) with CP for the last symbol.

Figure 16:
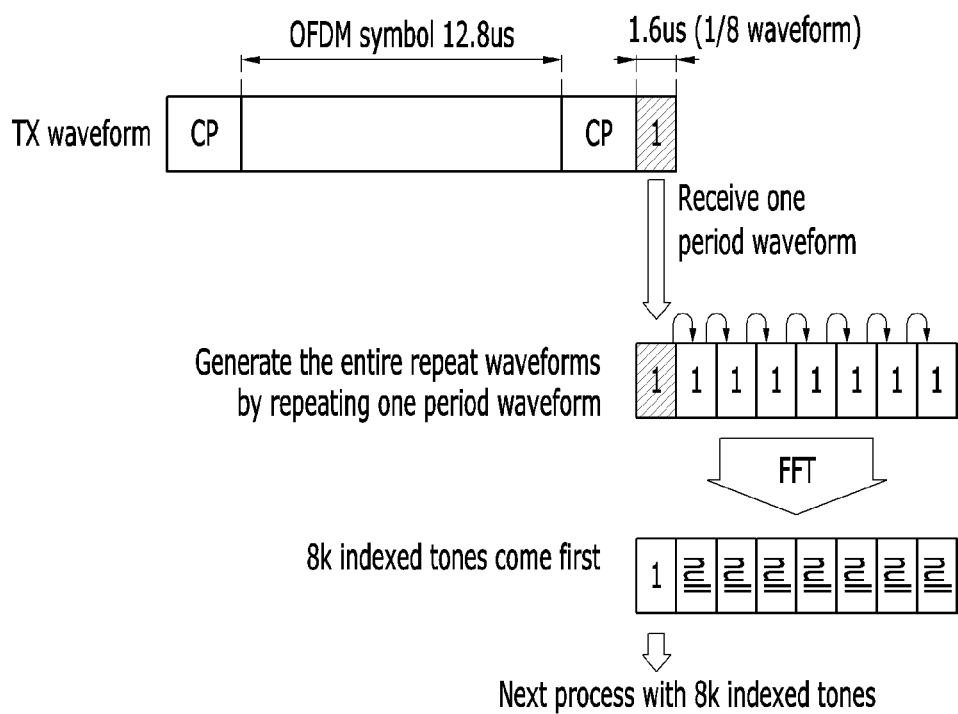
FIG. 16 shows a decoding process of the last symbol for ⅛ waveform according to an embodiment of the present disclosure.

In case 1, the data tones for 20 MHz bandwidth are allocated to data subcarriers with 8k (k=±1, ±2, . . . ) indices. The dummy bits are padded to fill the 24 data tones. After allocating the data tones with 8k indices, the IFT 140 performs an inverse Fourier transform. The waveform of 12.8 us (=8*1.6 us), where the 1.6 us duration is repeated eight times, is output from the IFT 140. That is, a waveform having 1.6 us period is output by 8 periods per symbol. Referring to FIG. 16 (*a*), only one period (=1.6 us) is transmitted as the last OFDM symbol.

In case 2, the data tones for 20 MHz bandwidth are allocated to data subcarriers with 4k (k=±1, ±2, . . . ) indices. The dummy bits are padded to fill the 48 data tones. After allocating the data tones with 4k indices, the IFT 140 performs an inverse Fourier transform. The waveform of 12.8 us (=4*3.2 us), where a waveform having 3.2 us duration is repeated 4 times, is output from the IFT 140. That is, a waveform having 3.2 us period is output by 4 periods per symbol. Referring to FIG. 16 (*b*), only one period (=3.2 us) is transmitted as the last OFDM symbol.

In case 3, the data tones for 20 MHz bandwidth are allocated to data subcarriers with 2k (k=±1, ±2, . . . ) indices. The dummy bits are padded to fill the 102 data tones. After allocating the data tones with 2k indices, the IFT 140 performs an inverse Fourier transform. The waveform of 12.8 us (=2*6.4 us), where a waveform of 6.4 us duration is repeated 2 times, is output from the IFT 140. That is, a waveform having 6.4 us period is output by 2 periods per symbol. Referring to FIG. 16 (*c*), only one period (=6.4 us) is transmitted as the last OFDM symbol.

In case 4, the data tones for 20 MHz bandwidth are allocated to all data subcarriers. The waveform of 12.8 us with no repetition is output from the IFT 140. Therefore, the same padding rules in the legacy systems are used with 234 data subcarriers. Referring to FIG. 16 (*d*), one whole symbol, where the symbol duration excluding CP is 12.8 us, is transmitted as the last OFDM symbol.

As such, the transmitter may save transmission duration of 7*1.6 us, 3*3.2 us and 1*6.4 us for cases 1, 2, and 3, respectively, as shown in FIG. 16. In addition, the transmitter may inform the actual length of a packet according to the length of the last symbol. The actual length of a packet may be indicated in the L-SIG field as shown in FIG. 14.

As such, according to one embodiment, all data subcarriers allocated to the data tones with 2k, 4k, or 8k indices are filled by padding the dummy bits.

In another embodiment, the unfilled subcarriers may be replaced with the null subcarriers transmitting "0", instead of filling all data subcarriers of 24 or 48 or 102 or 234. The unfilled data tones are regarded as the dummy bits in the interleaver. Therefore, the same size of interleavers may be also used in another embodiment. The transmitter may save the transmission power in the last symbol or boost the used subcarriers in the last symbol.

Figure 17:
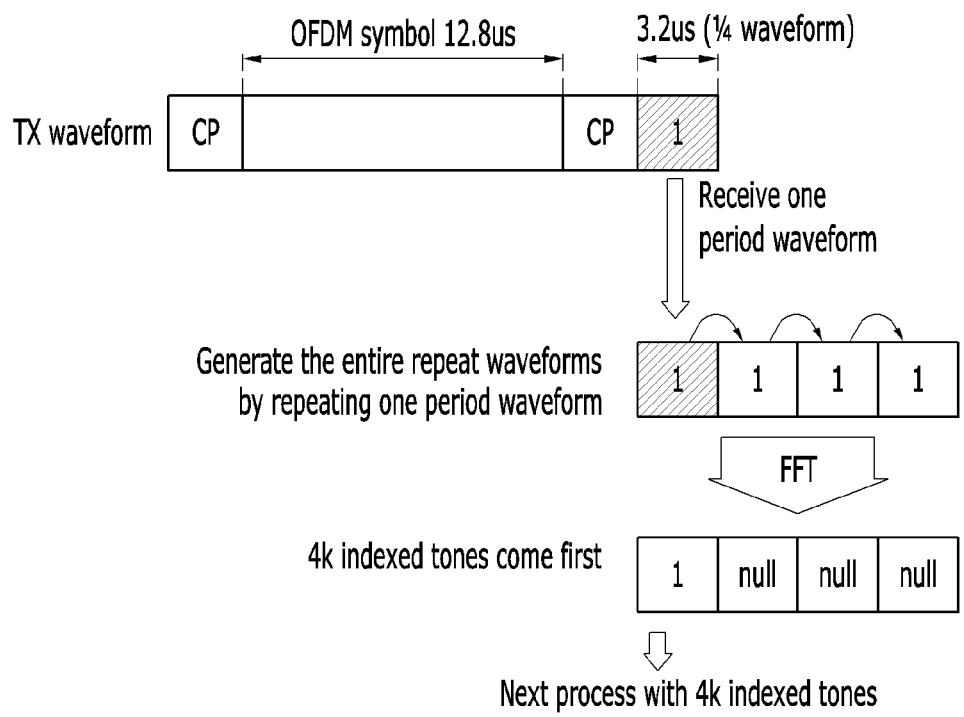
FIG. 17 shows a decoding process of the last symbol for ¼ waveform according to an embodiment of the present disclosure.
Figure 18:
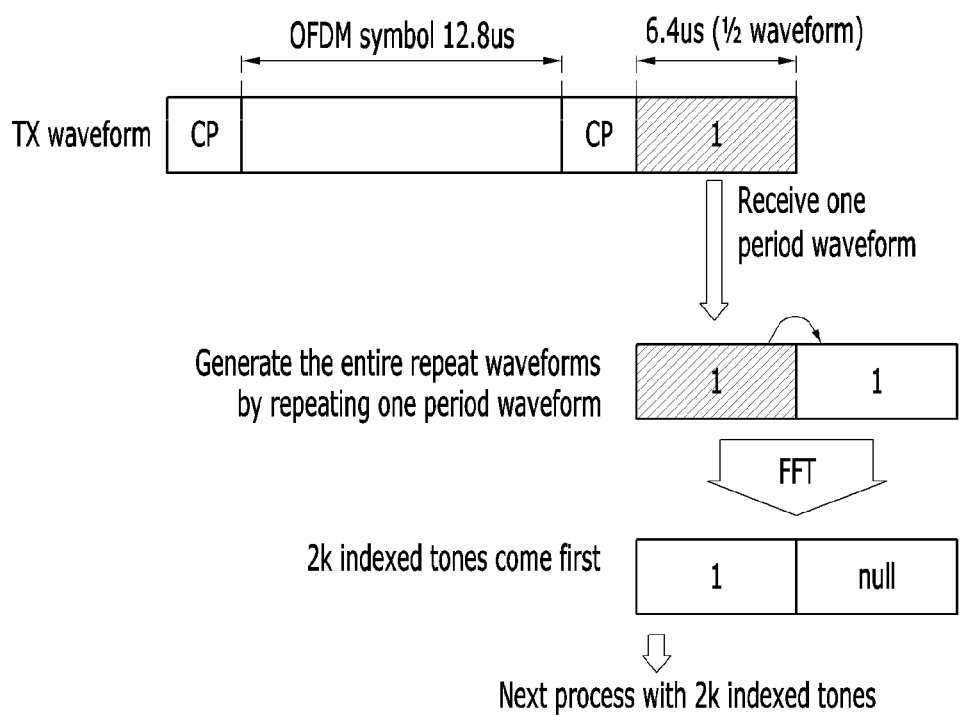
FIG. 18 shows a decoding process of the last symbol for ½ waveform according to an embodiment of the present disclosure.

FIG. 16 shows a decoding process of the last symbol for ⅛ waveform according to an embodiment of the present disclosure, FIG. 17 shows a decoding process of the last symbol for ¼ waveform according to an embodiment of the present disclosure, and FIG. 18 shows a decoding process of the last symbol for ½ waveform according to an embodiment of the present disclosure.

Referring to FIG. 16 to FIG. 18, a receiver receives the symbol of the FIG. 15. The receiver performs a Fourier transform of the received symbol.

Referring to FIG. 16, the receiver receives the last symbol for ⅛ waveform as shown in FIG. 15 (*a*). The receiver receives only one period waveform (=1.6 us), and repeats the received waveform seven times to generate an interval including eight periods for an FFT operation.

Then the receiver applies a 256 FFT to the interval on the 20 MHz bandwidth. Due to butterfly architecture of the FFT operation, the 8k indexed tones come first and then the other indexed tones come later.

The data tones with 8k indices are de-mapped according to the MCS information and then de-interleaved with the size of 24.

Referring to FIG. 17, the receiver receives the last symbol for ¼ waveform as shown in FIG. 15 (*b*). The receiver receives only one period waveform (=3.2 us), and repeats the waveform three times to generate an interval including four periods for the FFT operation.

The receiver applies the 256 FFT to the interval on the 20 MHz bandwidth. Due to butterfly architecture of the FFT operation, the 4k indexed tones come first and then the other indexed tones come later.

The data tones with 4k indices are de-mapped according to the MCS information and then de-interleaved with the size of 48.

Referring to FIG. 18, the receiver receives the last symbol for ½ waveform as shown in FIG. 15 (*c*). The receiver receives only one period waveform (=6.4 us), and repeats the waveform one time to generate an interval including two periods for the FFT operation.

The receiver applies the 256 FFT to the interval on the 20 MHz bandwidth. Due to butterfly architecture of the FFT operation, the 2k indexed tones come first and then the other indexed tones come later.

The data tones with 2k indices are de-mapped according to the MCS information and then de-interleaved with the size of 102.

If the receiver receives the last symbol with no repetition as shown in FIG. 15 (*d*), the decoding process is the same as conventional process because all data subcarriers are used. In this case 4, the receiver uses the deinterleaver size being 234.

Figure 19:
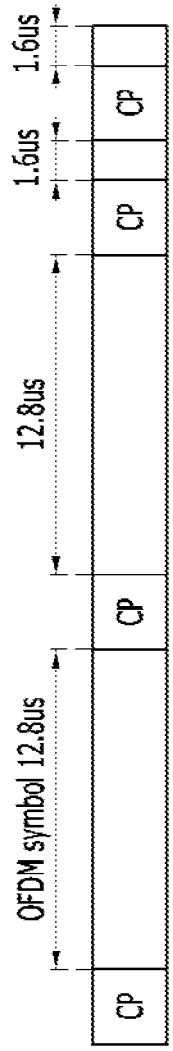
FIGS. 19 (a) to 19 (c) show OFDM symbol structures of the last four symbols according to another embodiment of the present disclosure.
Figure 19:
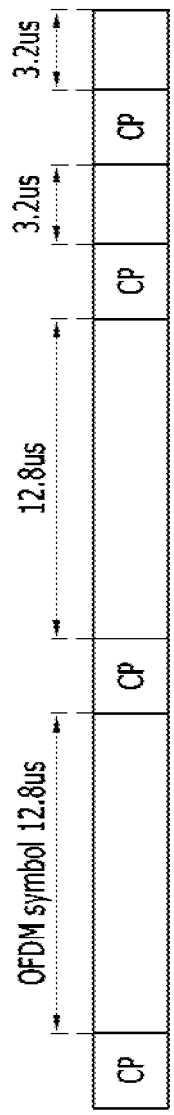
Figure 19:
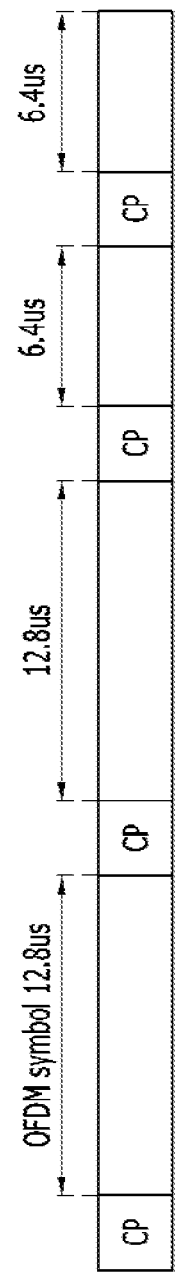

FIG. 19 shows OFDM symbol structures of the last four symbols according to another embodiment of the present disclosure.

Referring to FIG. 19, the transmitter may further include a space-time block code (STBC) encoder (STBC block of FIG. 13) or a space-frequency block code (SFBC) encoder. The transmitter may be use the Alamouti code to encode the consecutive data tones for the STBC. The number of used data tones may be calculated by a factor, i.e., ½.

If the number of used data tones before padding is corresponding to the case 1 of Table 3, the last four symbols with the STBC may be transmitted as shown in FIG. 19 (*a*). Only one period (=1.6 us) in the eight times repeated waveforms is transmitted as the last OFDM symbol by using the 8k indexed subcarriers as the data tones.

If the number of used data tones before padding is corresponding to the case 2 of Table 3, the last four symbols with the STBC may be transmitted as shown in FIG. 19 (*b*). Only one period (=3.2 us) in the four times repeated waveforms is transmitted as the last OFDM symbol by using the 4k indexed subcarriers as the data tones.

If the number of used data tones before padding is corresponding to the case 3 of Table 3, the last four symbols with the STBC may be transmitted as shown in FIG. 19 (*c*). Only one period (=6.4 us) in the two times repeated waveforms is transmitted as the last OFDM symbol by using the 2k indexed subcarriers as the data tones.

If the number of used data tones before padding is corresponding to the case 4 of Table 3, one whole symbol duration (=12.8 us) is transmitted as the last OFDM symbol by using the all data subcarriers as the data tones.

The receiver receives the waveforms of FIGS. 19 (a), (b), and (c). The FFT output of the each symbol in the last two symbols is the same as shown in FIG. 16, FIG. 17, and FIG. 18. Then the receiver decodes the received waveforms according to the STBC decoding method.

Figure 20:
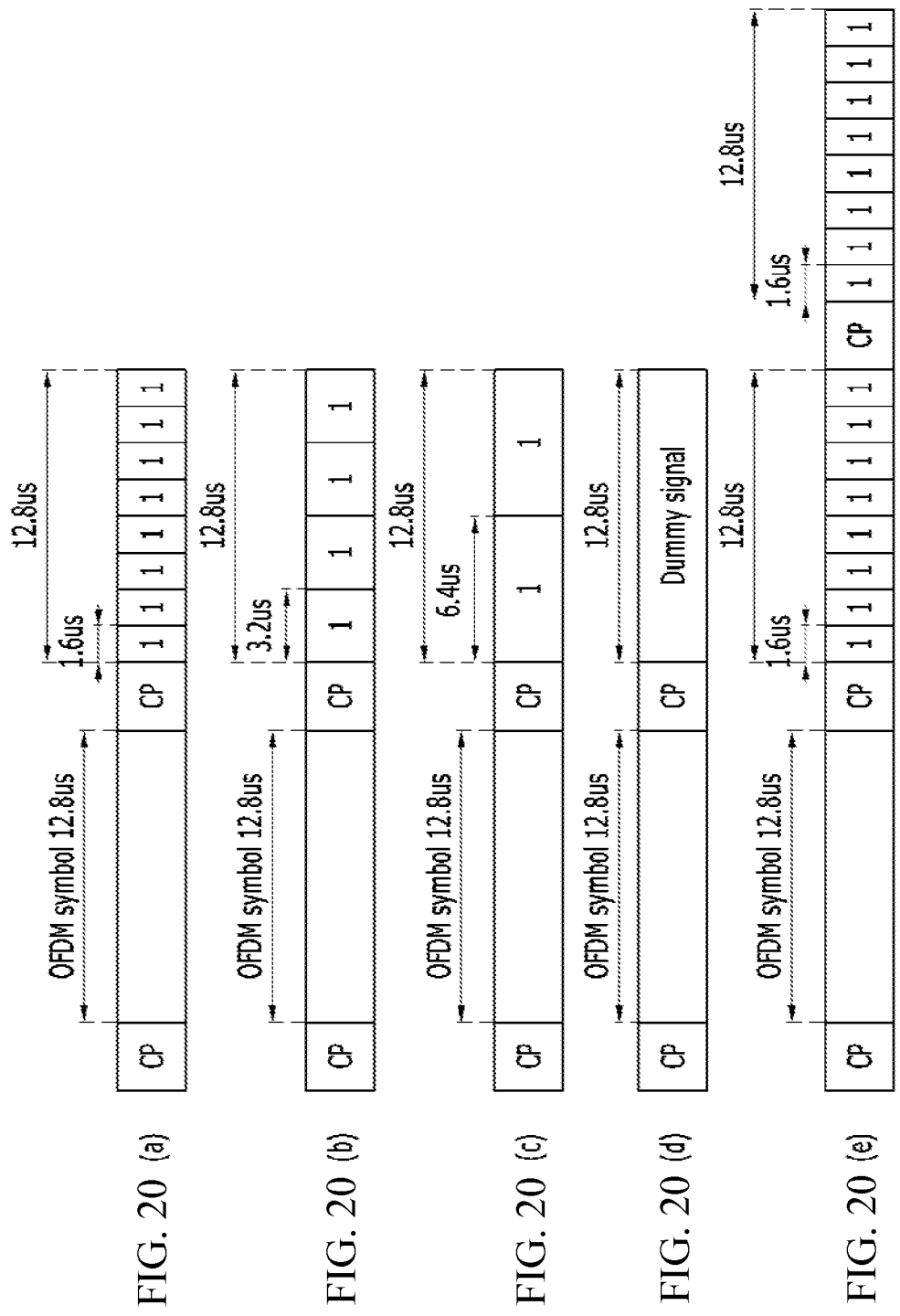
FIGS. 20 (a) to 20 (e) show OFDM symbol structures of the last two symbols according to yet another embodiment of the present disclosure.

FIG. 20 shows OFDM symbol structures of the last two symbols according to yet another embodiment of the present disclosure.

Referring to FIG. 20, at the receiver, it may be difficult to meet the packet decoding delay which is less than SIFS given by 16 us, when the long symbol duration (e.g., 12.8 us+CP duration) is used in the IEEE 802.11ax.

To secure the longer decoding time at the receiver, the transmitter may transmit the last symbol including dummy signal. The transmitter informs the length including the dummy signal by indicating the length in the L-SIG field. Therefore, other devices measure the SIFS time at the end of the packet including the dummy signal. The dummy signal has a role to secure longer time to decode a packet at the receiver. The receiver ignores the dummy signal.

The structures of the last symbol to secure the decoding time are determined according to the payload size as described above.

In case 1 of Table 3, the transmitter may transmit the last symbol including eight times repeated waveforms as shown in FIG. 20 (a). Therefore, the last symbol duration excluding the CP is 12.8 us, if a 256 FFT is applied. The number of used data tones in the last symbol is the same as shown in FIG. 15 (a).

In case 2 of Table 3, the transmitter may transmit the last symbol including four times repeated waveforms as shown in FIG. 20 (b). The number of used data tones in the last symbol is the same as shown in FIG. 15 (b).

In case 3 of Table 3, the transmitter may transmit the last symbol including two times repeated waveform as shown in FIG. 20 (c). The number of used data tones in the last symbol is the same as in FIG. 15 (c).

In case 4 of Table 3, the transmitter may transmit one additional dummy symbol as the last symbol as shown in FIG. 20 (d). The additional dummy symbol includes all dummy data tones.

When the transmitter uses the STBC encoder and the used data tones obtained by the payload size is corresponding to the case 1 of Table 3, the transmitter may transmit the last two symbols including eight times repeated waveforms, respectively, as shown in FIG. 20 (e).

Figure 21:
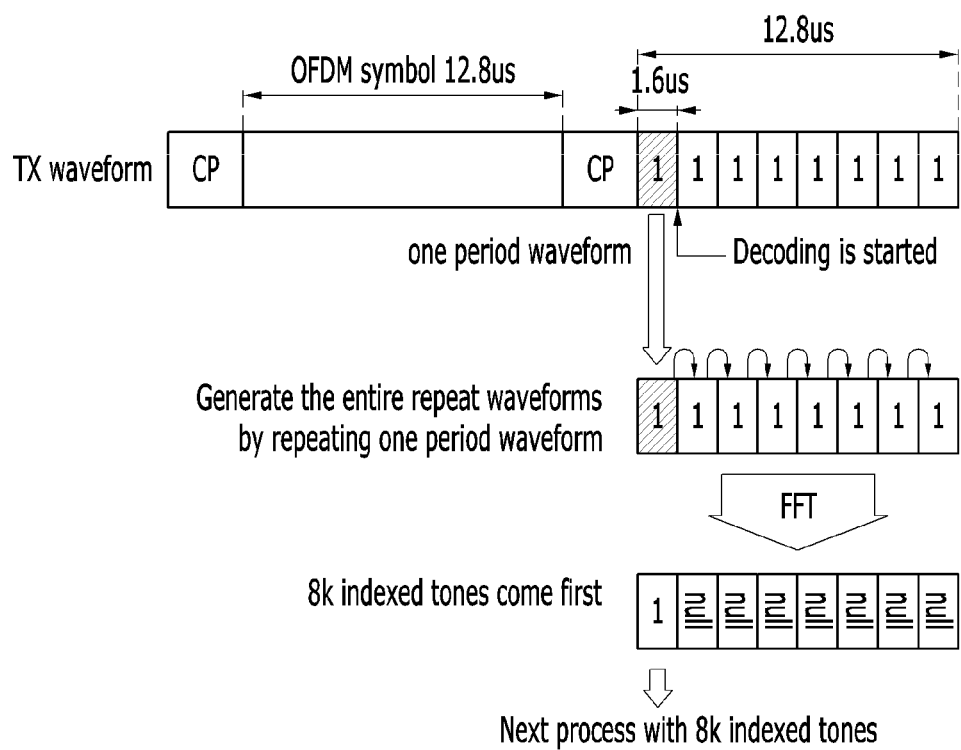
FIG. 21 shows a decoding process of the last symbol including eight times repeated waveforms according to yet another embodiment of the present disclosure.
Figure 22:
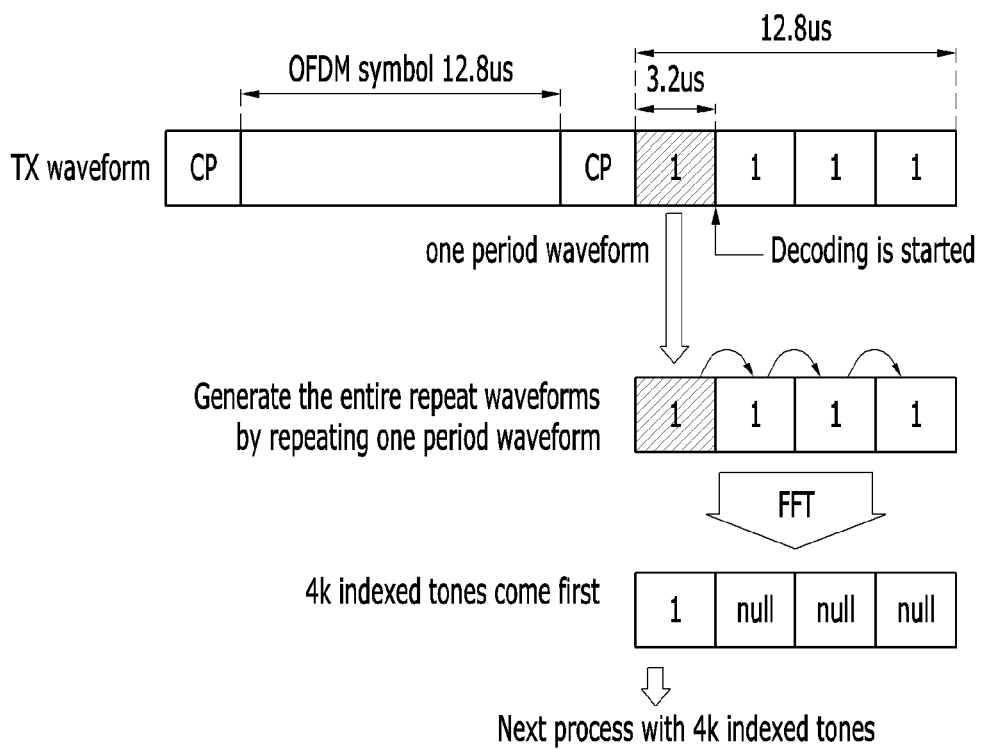
FIG. 22 shows a decoding process of the last symbol including four times repeated waveforms according to yet another embodiment of the present disclosure.
Figure 23:
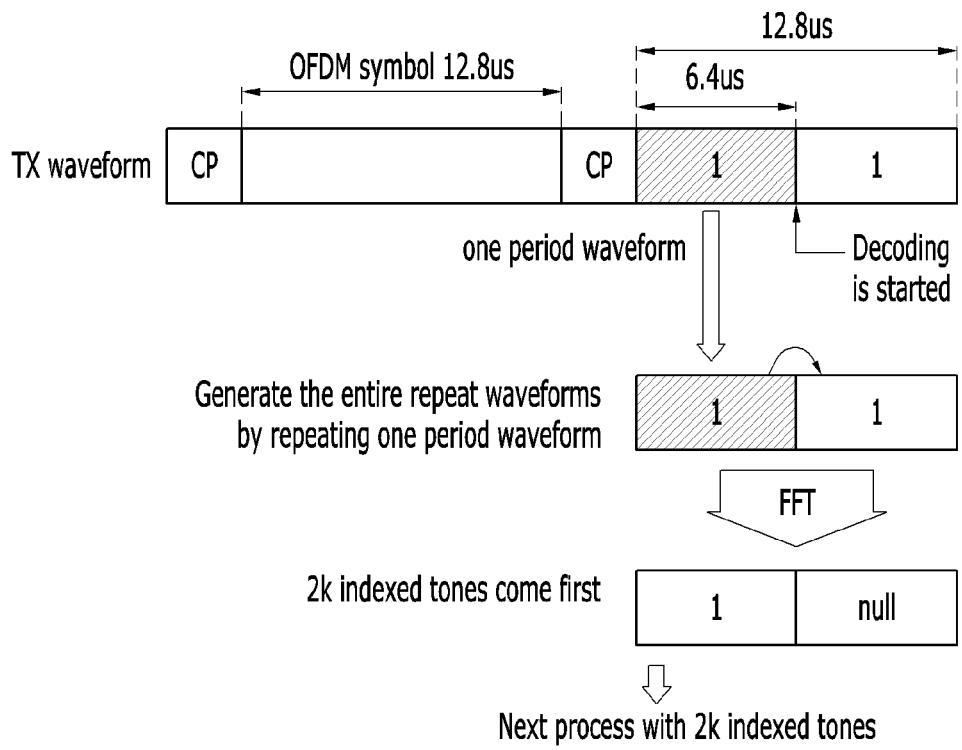
FIG. 23 shows a decoding process of the last symbol including two times repeated waveforms according to yet another embodiment of the present disclosure.
Figure 24:
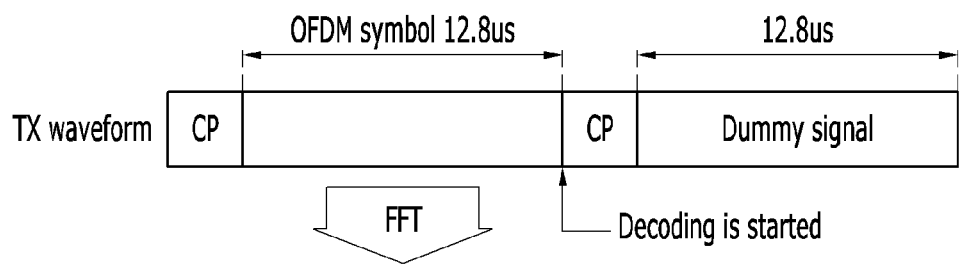
FIG. 24 shows a decoding process of the last symbol including dummy signal according to yet another embodiment of the present disclosure.
Figure 25:
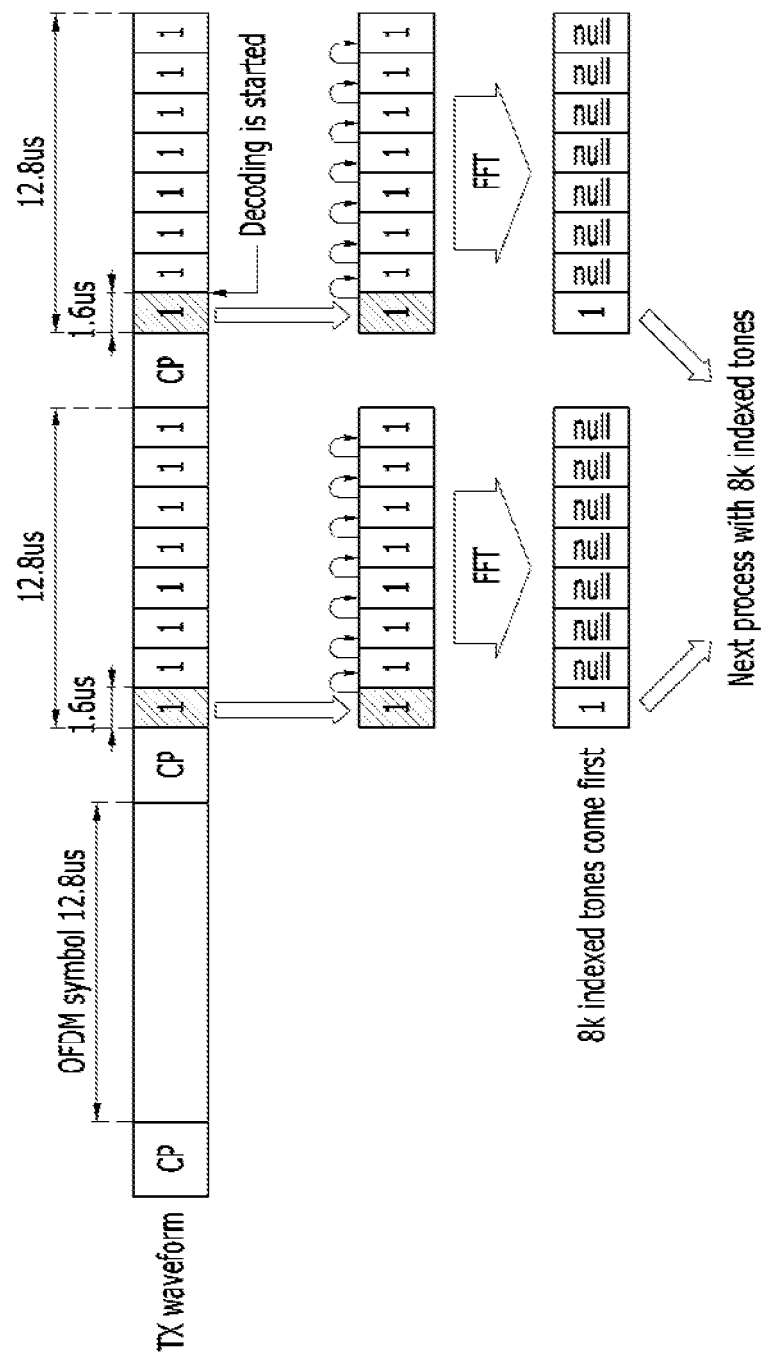
FIG. 25 shows a STBC decoding process of the last two symbols according to yet another embodiment of the present disclosure.

FIG. 21 shows a decoding process of the last symbol including eight times repeated waveforms according to yet another embodiment of the present disclosure, FIG. 22 shows a decoding process of the last symbol including four times repeated waveforms according to yet another embodiment of the present disclosure, FIG. 23 shows a decoding process of the last symbol including two times repeated waveforms according to yet another embodiment of the present disclosure, FIG. 24 shows a decoding process of the last symbol including dummy signal according to yet another embodiment of the present disclosure, and FIG. 25 shows a STBC decoding process of the last two symbols according to yet another embodiment of the present disclosure.

Referring to FIG. 21 to FIG. 25, a receiver receives the symbol of FIG. 20.

Referring to FIG. 21, the receiver receives the last symbol including eight times repeated waveforms. The receiver starts the decoding of the last symbol at the end of the first period waveform in the eight times repeated waveforms. The reason is that the remaining waveforms of the last symbol are just the repeated part of the first period waveform.

The receiver receives the first period waveform (=1.6 us), and then repeats the first period waveform seven times to generate an interval including eight periods. The receiver applies a 256 FFT to the interval on the 20 MHz bandwidth. As the FFT output, the 8k indexed tones come first and then the other indexed tones come later, due to butterfly architecture of an FFT operation. The data tones with 8k indices are de-mapped according to the MCS information and then de-interleaved with the size of 24.

Referring to FIG. 22, the receiver receives the last symbol including four times repeated waveforms. The receiver starts the decoding of the last symbol at the end of the first period waveform in the four times repeated waveforms.

The receiver receives the first period waveform (=3.2 us), and then repeats the first period waveform three times to generate an interval including four periods. The receiver applies a 256 FFT to the interval on the 20 MHz bandwidth. As the FFT output, the 4k indexed tones come first and then the other indexed tones come later, due to butterfly architecture of an FFT operation. The data tones with 4k indices are de-mapped according to the MCS information and then de-interleaved with the size of 48.

Referring to FIG. 23, the receiver receives the last symbol including two times repeated waveforms. The receiver starts the decoding of the last symbol at the end of the first period waveform in the two times repeated waveforms.

The receiver receives the first period waveform (=6.4 us), and then repeats the first period waveform one time to generate an interval including two periods. The receiver applies a 256 FFT to the interval on the 20 MHz bandwidth. As the FFT output, the 2k indexed tones come first and then the other indexed tones come later, due to butterfly architecture of an FFT operation. The data tones with 2k indices are de-mapped according to the MCS information and then de-interleaved with the size of 102.

Referring to FIG. 24, if the receiver receives the last symbol including dummy signal, the receiver does not decode the last symbol to ignore the dummy signal. The receiver starts the decoding process before the last symbol.

Referring to FIG. 25, the receiver receives the last two symbols of FIG. 20 (e). The last two symbols have the same structure by the STBC.

The receiver starts the decoding process at the end of the first period waveform of the last symbol. That is, the remaining waveforms of the last symbol are just the repeated part of the first period waveform. Therefore, the receiver repeats the first period waveform seven times to generate an interval including eight periods for the last symbol. In the next to the last symbol, it is possible to receive entirely the symbol having eight times repeated waveforms, instead of repeating the first period waveform.

The receiver applies a 256 FFT to each of the waveforms on the 20 MHz bandwidth. As the FFT output, the 8k indexed tones come first and then the other indexed tones come later, due to butterfly architecture of an FFT operation. The data tones with 8k indices are used in the STBC decoding process.

Hereinafter, the method to indicate the structure of the last symbol is described.

The present disclosure may change the structure of the last symbol depending to the payload. Therefore, the way to indicate the structure of the last symbol is needed for a receiver to know the structure.

As an explicit method, a HE-SIG field is used to indicate the structure of the last symbol. The dedicated bits in HE-SIG field may be assigned for the indicator. If the dedicated bits in HE-SIG are not available, the present disclosure applies for only single-user (SU) mode and uses the reserved bits exist in the SU mode in HE-SIG field. While the HE-SIG bits have the different meaning in SU mode and multi-user (MU) mode, there are more reserved bits in the SU mode than in the MU mode.

As another explicit method, the Length field in the L-SIG field is used to indicate the structure of the last symbol. The length information with "M" is calculated as Equation 2.

$$\text{Length} = \frac{TXTIME - 20}{4} \times 3 - 3 - M, 0 \le M \le 2 \quad \text{(Equation 2)}$$

The cases 2, 3, and 4 of Table 3 may be indicated by "M" of the Length field as below:

M=0: case 4
M=1: case 3
M=2: case 2

Even though three different values of "M" are used, the legacy receivers realize the length as the same (the same packet duration) because one OFDM symbol with the lowest rate includes 3 bytes data. Therefore, the L-LENGTH can imply three different structures of the last symbol with the value of "M" without changing the operation of the legacy receiver.

As an implicit method, the exact number of bytes of payload may be used to estimate the structure of the last symbol. The exact size of payload in MAC header may be used to obtain the structure of the last symbol. Because the MAC header is located at the beginning of the packet, the receiver can extract the exact size of payload before decoding the last symbol. With the MCS, bandwidth, number of space-time streams, STB(F)C option information in addition to the payload size, the number of used data tones can be calculated before decoding the last symbol. The receiver estimates the structure of the last symbol by the number of the used data tones.

The present disclosure described with the last symbol may be used in other OFMD symbol, for example, the HE-SIG field. The HE-SIG-B structure to reduce the duration of HE-SIG-B symbols by using 2k, 4k, or 8k indexed tones. Referring to FIG. 13, the HE-SIG-B field follows the HE-LTF field. The HE-LTF field is a training symbol only for HE-SIG-B decoding and uses the same tones as in HE-SIG-B field. However, the HE-LTFs is training symbols both for the HE-SIG-B decoding and for DATA decoding. The used tones for HE-LTFs will not identical with those for HE-SIG-B.

So far, the data tone allocation is described as above. For the present disclosure, the pilot tone allocation should be considered with the data tone allocation at the same time. Hereinafter, the methods to assign pilots are described as below.

Figure 26:
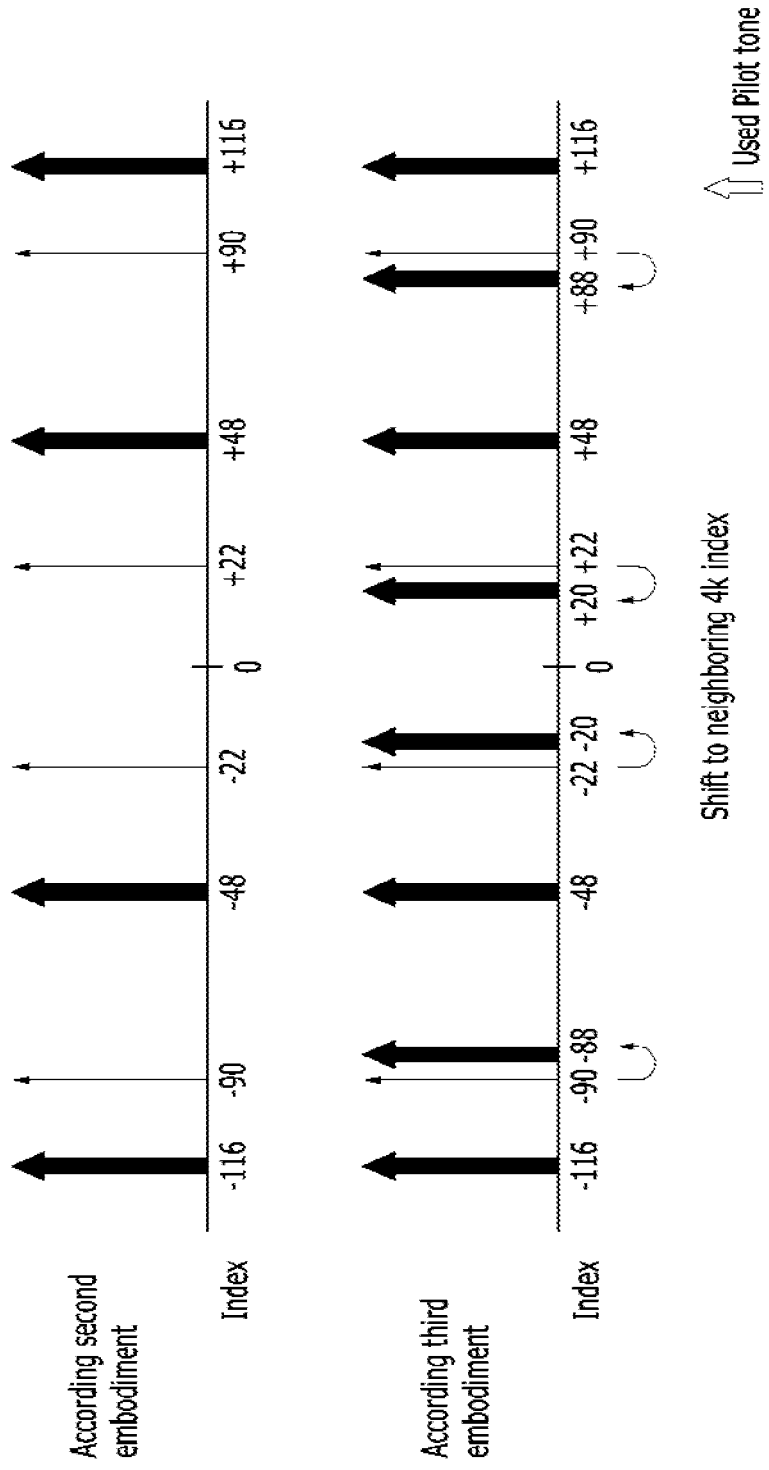
FIG. 26 shows an example of assigning pilots in the last symbol according to an embodiment of the present disclosure.

FIG. 26 shows an example of assigning pilots in the last symbol according to an embodiment of the present disclosure.

According to first embodiment, no pilot is transmitted in the last symbol. Because the last symbol does not be used to track the phase at the receiver, it does not matter whether the pilot in the last symbol is transmitted or not.

According to second embodiment, the pilot tones are assigned to tones with 8k or 4k or 2k indices, depending on the cases which are adopted in the standard. According to the second embodiment, the pilots may be assigned as below:

The pilot tones for 20 MHz bandwidth are allocated in subcarriers with 8k (k=±1, ±2, . . . ) indices. If the cases 1 to 4 of Table 3 are adopted in the standard, the pilot tones are allocated to subcarriers with 8k indices.

The pilot tones for 20 MHz bandwidth are allocated in subcarriers with 4k (k=±1, ±2, . . . ) indices. If the cases 2 to 4 of Table 3 are adopted in the standard, the pilot tones are allocated to subcarriers with 4k indices.

The pilot tones for 20 MHz bandwidth are allocated in subcarriers with 2k (k=±1, ±2, . . . ) indices. If the cases 3 and 4 of Table 3 are adopted in the standard, the pilot tones are allocated to subcarriers with 2k indices.

According to third embodiment, if some pilot tones with non-8k, non-4k, or non-2k indices are pre-assigned, the pilot tones are shifted to the 8k, 4k, or 2k indexed neighboring tones, depending on the cases which are adopted in the standard. According to the third embodiment, the pilots are assigned as below:

For the last symbol, pilot tones are shifted to neighboring 8k (k=±1, ±2, . . . ) indices, while the cases 1 to 4 of Table 3 are adopted in the standard.

For the last symbol, pilot tones are shifted to neighboring 4k (k=±1, ±2, . . . ) indices, while the case 2 to 4 of Table 3 are adopted in the standard.

For the last symbol, pilot tones are shifted to neighboring 2k (k=±1, ±2, . . . ) indices, while the case 3 to 4 of Table 3 are adopted in the standard.

Even though the standard adopts the cases 1 to 4 allocating the data tones with 2k, 4k, or 8k indices, the some pilots may be assigned to non-8k, non-4k, or non-2k indices. In this case, the transmitter shifts the location of pilots to neighboring 8k, 4k, or 2k indexed tones only for the last symbol and assigns the neighboring 8k 4k, or 2k indexed tones as the pilot tones. The third embodiment may be used to guarantee the number of the pilots required in the symbol.

Figure 27:
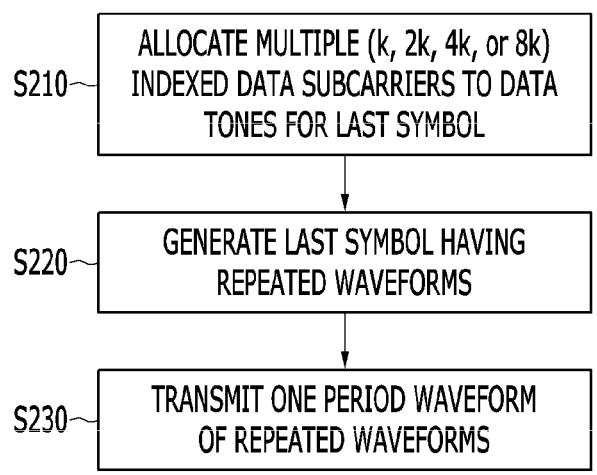
FIG. 27 is a flow chart illustrating a method for transmitting frames according to an exemplary embodiment of the present disclosure.

Referring to FIG. 27, it is assumed that eight indices [±22, ±48, ±90, ±116] are assigned to the pilots on 20 MH bandwidth.

If the pilot tones are allocated in subcarriers with 4k indices according to the second embodiment, the four pilots with the 4k indices [±48, ±116] in the eight indices [±22, ±48, ±90, ±116] are just used as the pilot for the symbol.

If the eight pilots per symbol are required, the transmitter may allocate more pilots according to the third embodiment. Because the four pilots with the non-4k indices [±22, ±90] are not used, four pilots are deficient. To satisfy the required number of the pilots, some subcarriers with the neighboring 4k indices of the non-4k indices [±22, ±90] are assigned to the pilot tones. The four subcarriers with 4k indices [±24 and ±92] which are located around the non-4k indices [±22, ±90] are assigned to the pilot tones. Or the four subcarriers with 4k indices [±20 and ±88] which are located around the non-4k indices [±22, ±90] are assigned to the pilot tones. That is, the non-4k indices [±22, ±90] are shifted to the nearest 4k indices [±20, ±88] or [±24, ±92].

So far, the present disclosure is described with 8k, 4k, or 2k indexed tones. In addition, other indices may be used for the present disclosure as below:

For the case 1 of Table 3, 8k+i (k=±1, ±2, . . . ) with any shift value of i∈{0, 1, 2, . . . , 7} indices can be used.

For the case 2 of Table 3, 4k+i (k=±1, ±2, . . . ) with any shift value of i∈{0, 1, 2, 3} indices can be used.

For the case 3 of Table 3, 2k+i (k=±1, ±2, . . . ) with any shift value of i∈{0, 1} indices can be used.

When i=0, the output of IDFT has the repeated waveform as explained previously. However, the output of IDFT is not repeated when i≠0. Due to the property of DFT, the output with i≠0 is the phase shifted version of the repeated waveform when i=0. Then, the shift value of "i" is known, the receiver can know and construct the whole waveforms of IDFT output with only first 1.6 us, 3.2 us, or 6.4 us waveform in cases 1, 2, and 3, respectively.

This shift value information of "i" may be indicated to the receiver by an alternative to an explicit way or an implicit way.

This shift value information of "i" may be included in HE-SIG field as the explicit way.

This shift value information of "i" may be calculated from the slope of the phase at the receiver. The waveforms generated from different shift values represent different slopes of phase in time domain. Therefore, the receiver can recover the slope of phase, i.e., the shift value "i", if the two repeated waveforms is available. When the part of the second repeated waveform is available, the receiver can estimate the slope of phase. However, the accuracy of estimation may be degraded.

Figure 28:
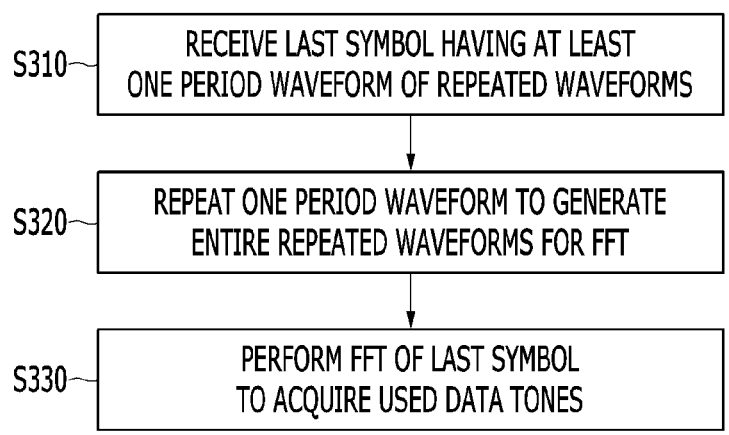
FIG. 28 is a flow chart illustrating a method for receiving frames according to an exemplary embodiment of the present disclosure.

FIG. 27 is a flow chart illustrating a method for transmitting frames according to an exemplary embodiment of the present disclosure, and FIG. 28 is a flow chart illustrating a method for receiving frames according to an exemplary embodiment of the present disclosure.

Referring to the FIG. 27, a transmitter may allocate the multiple indexed data subcarriers to data tones for last symbol based on the payload size (S210). The multiple indexed data subcarriers includes the subcarriers with k (k=±2, ±3, . . . ) indices, 2k (k=±1, ±2, . . . ), 4k (k=±1, ±2, . . . ), or 8k (k=±1, ±2, . . . ) indices. The transmitter determines the multiple indexed data subcarriers based on the number of used data tones in the last symbol before padding.

The transmitter may generate a last symbol having repeated waveforms (S220). The repeated waveforms are output of the inverse Fourier transform of the 2k, 4k, or 8k indexed subcarriers.

The transmitter may transmit one period waveform of the repeated waveforms (S230). According to another embodiment, the transmitter may transmit the entire repeated waveforms to secure the decoding time at a receiver.

In addition, the transmitter considers the assigning of the pilot based on the used data tones. The length indicated in the L-SIG field is adjusted according to the duration of the last symbol. The structure (repetition) information of the last symbol is indicated in some dedicated field explicitly for a receiver. Or the receiver estimates the structure of the last symbol implicitly based on the payload size. The structure of the last symbol is classified by ⅛ repeated waveform (case 1), ¼ repeated waveform (case 2), ½ repeated waveform (case 3), or no repetition (case 4).

Referring to the FIG. 28, a receiver receives a last symbol having at least one period waveform of the repeated waveforms (S310). Even though the last symbol having the entire repeated waveforms to secure the decoding time, a receiver starts the decoding process at the end of the first repeated waveform.

The receiver may repeat the one period waveform to generate entire repeated waveforms for a FFT operation (S320).

The receiver may perform a FFT of the last symbol to acquire the used data tones (S330). According to the structure of the last symbol, the used data tones with 8k, 4k, 2k, or k indices come first.

In addition, the receiver knows the structure of the last symbol by the indication included in the dedicated field, or estimates the structure of the last symbol based on the payload size.

As such, the different padding structures are defined according to the number of used data tones according to embodiments. By allocating to every $2^{nd}$, $4^{th}$, or $8^{th}$ tones in an OFDM symbol, the repeated waveforms are generated. And by sending only one repeated waveform, the transmission time is saved. In addition, the transmitter transmits the entire repeated waveforms to secure longer decoding time at the receiver. The receiver starts the decoding process at the end of the first repeated waveform of the last symbol.

So far, the method of the present disclosure described above with reference to the drawings is performed in a device including a processor, a memory, and a transceiver, and the device is included in a WLAN device supporting a version prior to the IEEE 802.11ax or the IEEE 802.11ax. The WLAN device includes a memory storing instructions for performing the method of the present disclosure or loading an instruction from a storage and temporarily storing the loaded instruction, a processor executing an instruction stored in the memory or loaded from the storage to process the method of the present disclosure, and a transceiver transmitting a frame generated by the processor or receiving a frame transmitted through a wireless communication network. Here, the processor may include a baseband processor 10 of FIG. 1, and the memory may include the memory 40 of FIG. 1, and the transceiver may include the RF transceiver 20 and the antenna unit 30 of FIG. 1.

The foregoing exemplary embodiments of the present disclosure are not implemented only by an apparatus and a method, and therefore, may be realized by programs realizing functions corresponding to the configuration of the exemplary embodiment of the present disclosure or recording media on which the programs are recorded.

While the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims.

What is claimed is:

1. A method for facilitating wireless communications by a wireless device, the method comprising:
   receiving a first PPDU (PHY Protocol Data Unit) in a physical layer;
   delivering a first PSDU (Physical Service Data Unit) and an information indicative of a carrier frequency offset (CFO) derived from the first PPDU to a MAC (Media Access Control) layer;
   generating a second PSDU in the MAC layer;
   delivering the second PSDU and the information indicative of the CFO to the physical layer;
   generating a second PPDU using the information indicative of the CFO; and
   transmitting the second PPDU over a wireless channel from the wireless device.

2. The method of claim 1, wherein an indicator of a destination of the second PPDU indicates a transmitter of the first PPDU.

3. The method of claim 1, wherein the information indicative of the CFO is delivered from the physical layer to the MAC layer.

4. The method of claim 1, wherein the information indicative of the CFO is delivered from the MAC layer to the physical layer.

5. The method of claim 1, wherein the generating of the second PPDU includes:
pre-compensating a carrier frequency of the second PPDU using the information indicative of the CFO.

6. The method of claim 5, wherein the generating of the second PPDU further includes:
pre-compensating a sampling frequency of the second PPDU using the value of a sampling frequency offset (SFO),
wherein the value of the SFO is calculated based on the CFO.

7. The method of claim 6, wherein the pre-compensating of the sampling frequency is performed before an operation of an inverse Fourier transform, and the pre-compensating of the carrier frequency is performed after the inverse Fourier transform operation.

8. The method of claim 7, wherein the generating of the second PPDU further includes:
correcting an output of the pre-compensating of the sampling frequency by subtracting or adding one sample in an output of the inverse Fourier transform.

9. A wireless device for facilitating wireless communications, the device comprising:
a first pre-compensator configured to compensate a sampling frequency with a sampling frequency offset (SFO);
an inverse Fourier transformer configured to perform an inverse Fourier transform to an output of the first pre-compensator; and
a second pre-compensator configured to compensate a carrier frequency with a carrier frequency offset (CFO) to an output of the inverse Fourier transformer,
wherein a value of the CFO is delivered from a Media Access Control layer.

10. The device of claim 9, wherein the first pre-compensator calculates a value of the SFO from the value of the CFO.

11. The device of claim 9, wherein the value of the CFO is estimated by using a receive frame in a physical layer and delivered to the Media Access Control layer from the physical layer,
the value of the CFO is stored with a source of the receive frame in the Media Access Control layer, and
the value of the CFO is delivered from the Media Access Control layer to the physical layer when an indication of a destination of a transmit frame indicates the source of the receive frame.

12. The device of claim 9, further comprising
a guard interval inserter configured to correct the output of the first pre-compensator by subtracting or adding one sample in the output of the inverse Fourier transformer.

* * * * *